US011000771B1

(12) United States Patent
Boocher et al.

(10) Patent No.: US 11,000,771 B1
(45) Date of Patent: May 11, 2021

(54) GAMEPLAY TELEMETRY AND VIDEO ACQUISITION SYSTEM

(71) Applicant: Electronic Arts Inc., Redwood City, CA (US)

(72) Inventors: John Charles Boocher, Apopka, FL (US); Matthew David Durfee, Apopka, FL (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 15/475,000

(22) Filed: Mar. 30, 2017

(51) Int. Cl.
*A63F 9/24* (2006.01)
*A63F 13/86* (2014.01)
*A63F 13/35* (2014.01)
*A63F 13/63* (2014.01)

(52) U.S. Cl.
CPC .............. *A63F 13/86* (2014.09); *A63F 13/35* (2014.09); *A63F 13/63* (2014.09)

(58) Field of Classification Search
CPC .......... A63F 13/86; A63F 13/63; A63F 13/35
See application file for complete search history.

(56) References Cited

U.S. PATENT DOCUMENTS

| | | | |
|---|---|---|---|
| 5,395,242 A | 3/1995 | Slye et al. | |
| 6,699,127 B1 | 3/2004 | Lobb et al. | |
| 7,214,133 B2 | 5/2007 | Jen et al. | |
| 7,632,186 B2 * | 12/2009 | Spanton | A63F 13/12 463/29 |
| 8,405,662 B2 | 3/2013 | Russell et al. | |
| 8,423,164 B2 | 4/2013 | Jaeger | |
| 8,591,332 B1 | 11/2013 | Bright et al. | |
| 8,622,839 B1 * | 1/2014 | McKenzie | A63F 13/355 463/40 |
| 8,870,661 B2 | 10/2014 | Perry et al. | |
| 9,005,033 B2 | 4/2015 | Figueroa | |
| 9,064,043 B2 | 6/2015 | Cathro | |
| 9,171,286 B2 | 10/2015 | Bhogal et al. | |
| 9,248,374 B2 | 2/2016 | Watson et al. | |
| 9,272,209 B2 | 3/2016 | Perlman et al. | |
| 9,393,486 B2 | 7/2016 | George | |
| 9,409,083 B2 | 8/2016 | George | |
| 9,474,973 B2 | 10/2016 | Perry et al. | |
| 10,016,689 B2 | 7/2018 | Lucas et al. | |
| 10,226,708 B2 | 3/2019 | Bruzzo et al. | |
| 2003/0216177 A1 | 11/2003 | Aonuma et al. | |
| 2006/0030407 A1 | 2/2006 | Thayer | |
| 2006/0148571 A1 | 7/2006 | Hossack et al. | |
| 2007/0060359 A1 | 3/2007 | Smith | |
| 2007/0294089 A1 | 12/2007 | Garbow et al. | |
| 2009/0048023 A1 | 2/2009 | Wang | |

(Continued)

FOREIGN PATENT DOCUMENTS

CN 103886008 A 6/2014

*Primary Examiner* — Dmitry Suhol
*Assistant Examiner* — Carl V Larsen
(74) *Attorney, Agent, or Firm* — Knobbe, Martens, Olson & Bear, LLP

(57) ABSTRACT

Systems and methods for automated acquisition of gameplay session data of a game application are disclosed. While the game application is executed in a gameplay session, embodiment of the systems and methods can acquire data associated with the game application. The data acquired during the gameplay session may be aggregated and searched across game sessions.

20 Claims, 14 Drawing Sheets

(56) References Cited

U.S. PATENT DOCUMENTS

| | | | |
|---|---|---|---|
| 2009/0118018 A1 | 5/2009 | Perlman et al. | |
| 2009/0258708 A1 | 10/2009 | Figueroa | |
| 2010/0069159 A1 | 3/2010 | Yamada et al. | |
| 2012/0083336 A1* | 4/2012 | Ocko | A63F 13/63 463/31 |
| 2012/0144311 A1* | 6/2012 | Yeh | G06Q 10/10 715/744 |
| 2012/0204153 A1 | 8/2012 | Peterson et al. | |
| 2013/0084985 A1 | 4/2013 | Green et al. | |
| 2013/0172086 A1 | 7/2013 | Ikenaga | |
| 2013/0244790 A1 | 9/2013 | Gary | |
| 2013/0263090 A1* | 10/2013 | Polk | G06F 11/3672 717/124 |
| 2014/0094313 A1 | 4/2014 | Watson et al. | |
| 2014/0228112 A1* | 8/2014 | Laakkonen | A63F 13/10 463/31 |
| 2014/0274297 A1* | 9/2014 | Lewis | A63F 13/00 463/20 |
| 2014/0337346 A1* | 11/2014 | Barthel | G06F 16/7867 707/738 |
| 2015/0262200 A1* | 9/2015 | Fredette | G06Q 50/01 705/7.29 |
| 2015/0287053 A1* | 10/2015 | Fredette | G06Q 30/02 705/7.29 |
| 2016/0027143 A1 | 1/2016 | Amidei et al. | |
| 2016/0059127 A1* | 3/2016 | Perrin | A63F 13/40 348/180 |
| 2016/0184712 A1 | 6/2016 | Colenbrander | |
| 2016/0236087 A1 | 8/2016 | McNeil et al. | |
| 2016/0332081 A1* | 11/2016 | Marr | A63F 13/63 |
| 2017/0001111 A1 | 1/2017 | Willette et al. | |
| 2017/0001112 A1* | 1/2017 | Gilmore | A63F 13/30 |
| 2017/0001119 A1 | 1/2017 | Perry et al. | |
| 2017/0001122 A1* | 1/2017 | Leung | A63F 13/86 |
| 2017/0157512 A1* | 6/2017 | Long | A63F 13/86 |
| 2017/0266568 A1* | 9/2017 | Lucas | A63F 13/86 |
| 2018/0161675 A1* | 6/2018 | Miron | A63F 13/497 |
| 2019/0076742 A1 | 3/2019 | Lucas et al. | |
| 2019/0351334 A1* | 11/2019 | Li | A63F 13/35 |

* cited by examiner

GAMEPLAY TELEMETRY AND VIDEO ACQUISITION SYSTEM

BACKGROUND

Video game applications have increased in popularity and complexity in recent years. Game applications have thousands of components and features that can be difficult to debug. Game developers can use bug reports obtained from play testers and other systems to detect and diagnose gameplay issues or bugs within a game application. Even with bug reports, it can be difficult to identify and replicate bugs within a game application.

SUMMARY OF EMBODIMENTS

The systems, methods, and devices of this disclosure each have several innovative aspects, no single one of which is solely responsible for the all of the desirable attributes disclosed herein.

An embodiment discloses a system comprising: at least one data store comprising gameplay data associated with a game application; and a server computing system in electronic communication with the at least one data store and configured to execute computer-readable instructions that configure the server computing system to: provide an indication to a first computing system to initiate a gameplay session of the game application; initiate data acquisition of the gameplay session of the game application executing on the first computing system; generate a session identifier for the gameplay session; receive video data associated with the gameplay session; associate the video data with the session identifier of the gameplay session; receive telemetric events triggered during the gameplay session, wherein each telemetric event is associated with an event timestamp based on when the event triggered during the gameplay session; associate the telemetric events with the session identifier of the gameplay session; and output the video data and telemetric events for storage within the at least one data store.

Another embodiment discloses a computer-implemented method comprising: under the control of a computer system comprising computer hardware, the computer system configured with computer executable instructions: providing an indication to a first computing system to initiate a gameplay session of a game application; initiating data acquisition of the gameplay session of the game application executing on the first computing system; generating a session identifier for the gameplay session; receiving video data associated with the gameplay session; associating the video data with the session identifier of the gameplay session; receiving telemetry events triggered during the gameplay session, wherein each telemetric event is associated with an event timestamp based on when the event triggered during the gameplay session; associating the telemetric events with the session identifier of the gameplay session; and outputting the video data and telemetric events for storage within at least one data store.

Another embodiment discloses a non-transitory computer-readable storage medium having stored thereon computer-readable instructions that, when executed, configure a computing system to: provide an indication to a first computing system to initiate a gameplay session of a gameplay session; initiate data acquisition of the gameplay session of the game application executing on the first computing system; generate a session identifier for the gameplay session; receive video data associated with the gameplay session; associate the video data with the session identifier of the gameplay session; receive telemetric events triggered during the gameplay session, wherein each telemetric event is associated with an event timestamp based on when the event triggered during the gameplay session; associate the telemetric events with the session identifier of the gameplay session; and output the video data and telemetric events for storage within the at least one data store.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Overview

Figure 1:
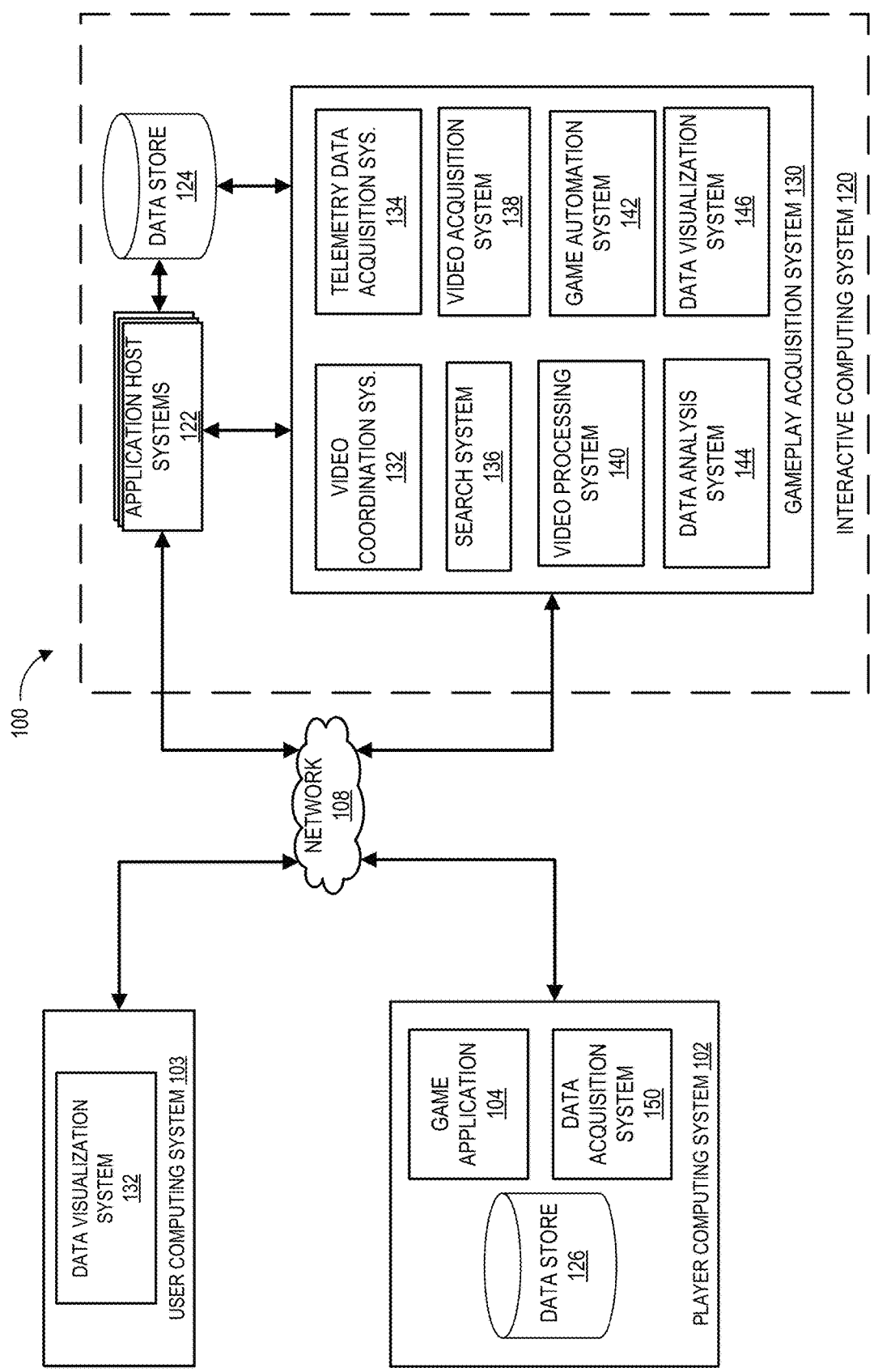
FIG. 1 illustrates an embodiment of a networked computing environment for implementing one or more embodiments of a gameplay acquisition system 130.

Testing software applications can be done manually (by a live tester) and can be automated. The automation of software application testing can be a difficult task. It can be difficult to automate game testing and it can be difficult to analyze the data that the automated game testing generates. Automated game testing can be useful for detecting some types of operational bugs within the game, such as, for example crashes, desyncs, game flow problems, freezing, and other types of bugs that affect operation of the game application. However, it can be difficult for automated testing to detect qualitative issues or bugs within an application, such as, for example, audio quality, visual quality, game balance, game flow, and other types of qualitative issues that affect software application.

Manual testing is generally used to assess qualitative issues within an application. The manual tester will be required to recreate an issue, encounter, and/or situation during runtime execution of the application. However, it can be difficult for a manual tester to spend the amount time necessary to recreate hundreds, and sometimes thousands, of different events that may be needed to be verified within an application. For example, a manual tester may need to verify the audio quality of dialogue within a game application. In some instances, the audio will be associated with a specific event, which may be difficult to recreate within the application. Accordingly, it may be difficult for a manual tester to recreate an event in order to verify the audio quality of the dialogue.

In order to address at least some of the difficulties with game testing, a gameplay acquisition system 130 can be used to capture and analyze video capture data associated with a game application. Game developers can obtain video and telemetry data during a gameplay session of the game application. The telemetry data can capture events that occur during runtime of the game application. The telemetry data may include, for example, a player's position, a character's physical movements, and their associated timestamps, and other information of a game application. Telemetry data of a game application can be used to recreate a game state and to analyze issues during game development. The telemetry data can be presented numerically in table format, charts, or as word descriptions.

The telemetry data can be associated with video data of the gameplay session. During the gameplay session, both telemetry data and video data are recorded. The gameplay session can have a session identifier (session ID). The telemetry data and video data of the gameplay session can both be linked to the same session ID.

The data acquired during the gameplay session may be streamed to a data analysis system and processed for further storage in a data store. The gameplay acquisition system 130 can automatically record telemetry events that occur during runtime of the gameplay session. The system can associate the telemetry data and the video data with the event based on the session ID and the timestamp of the event. Each event can be associated with a specific timestamp. After the data has been collected, the gameplay acquisition system 130 can provide a data visualization interface for a user to access the video and telemetry data. A user can search the telemetry data using the search system to identify events that occurred during gameplay sessions. The data visualization system can load the video and audio of the gameplay session at the time of a specific event. Advantageously, the search system can be used to search telemetry events recorded during different gameplay session. For example, in a football game, the search system can search for all touchdowns that occurred in the last two minutes of the game as the result of a run that was greater than 20 yards. The search can also allow a user to create customizable searches that allow a user to search for specific triggered events, such as specific telemetry data events. The system can automatically show the telemetry data and play the video data from the relevant timestamp when the user selects an event.

Overview of Gameplay Acquisition System 130

FIG. 1 illustrates an embodiment of a computing environment 100 for implementing a gameplay acquisition system 130. The environment 100 includes a network 108, a player computing system 102, a user computing system 103, and an interactive computing system 120. To simplify discussion and not to limit the present disclosure, FIG. 1 illustrates only one player computing system 102, one user computing system 103, and one interactive computing system 120, though multiple systems may be used.

The interactive computing system can include application host systems 122, one or more data stores 124, and a gameplay acquisition system 130. The gameplay acquisition system 130 can communicate with data store 124 and/or with the application host systems 122 to acquire data associated with a game application. The gameplay acquisition system 130 can communicate with user computing system 103, and player computing system 102 through the network 108. Although only one network 108 is illustrated, multiple distinct and/or distributed networks 108 may exist.

One or more of the systems described herein may be associated with the analysis of a game application 104. For example, the player computing system 102 can be configured to run the game application 104 and acquire data for the game application 104. The user computing system 103 can be configured to show analyses of the game application 104. The interactive computing system 120 may process the data acquired by and/or the player computing system 102 and communicate the results of the data analyses to the user computing system 103.

The player computing system 102 can be controlled by a user or a game automation system 142. The player computing system 102 can be used to acquire data of the game application 104 during gameplay sessions. The user computing system 103 can review events encountered during gameplay sessions of the game application 104. In some embodiments, a user, such as a game tester, may run a game application 104 on the player computing system 102. The data acquisition system of the player computing system 102 can capture data associated with a gameplay session of the game application 104. The captured data from gameplay sessions of the game application can be viewed and analyzed through the data visualization system 146. Users, such as game developers or customer service personnel, may use user computing system 103 to analyze events in a player gameplay session using the data visualization system 146.

The data visualization system 146 can provide an interface for the user to search and choose an event to review on a user computing system 103. The user computing system 103 can communicate with the interactive computing system 120 through the data visualization system 146 in order to retrieve video data associated with the event. The video data associated with the event can be retrieved and can be displayed at the specific time that the event occurs during the gameplay session. For example, a user may want to view the in-game camera angle or dialog associated with a specific event. The user may search for the event and the data visualization system 146 can display the video of the gameplay session at a specific time associated with the event. In some embodiments, the time shown in the video can be offset by a defined amount of time before the event occurred.

For purposes of the present disclosure, the term "player" or "player system" can refer to a game application that is being operated by a person or automated by the game automation system (also referred to as a "bot") during a gameplay session. For example, the player computing system 102 can refer to the computing system operated by the player or bot providing gameplay session data to the interactive computing system 120 through the data acquisition system 150. The term "user" can refer to a person that is accessing the gameplay acquisition system 130 to view gameplay data associated with player's gameplay sessions through the data visualization system 146. Though illustrated as separate systems, the player computing system 102 and the user computing system 103 can be the same computing system depending on whether the system is providing the gameplay session data or accessing the gameplay session data through the data visualization system 146.

A. Interactive Computing System

In the illustrated embodiment, the interactive computing system 120 includes application host systems 122, a data store 124, and a gameplay acquisition system 130. These systems may communicate with each other. For example, the gameplay acquisition system 130 can obtain data associated with a game application from the application host systems 122 and can store such data in the data store 124. The application host systems 122 can communicate with the data store 124 to execute and/or host a game application. In certain embodiments, the interactive computing system 120 may be associated with a network-based video service.

1. Application Host Systems

The application host systems 122 can be configured to execute a portion of the game application 104 and/or host application 106. In certain embodiments, the application host systems 122 may execute another application instead of or in addition to executing a portion of the game application 104 and/or host application 106, which may complement and/or interact with the game application 104 during execution of a gameplay session of the game application 104. Further details regarding application host systems are described below.

The interactive computing system 120 may enable multiple players or computing systems to access a portion of the game application 104 and/or host application 106. In some embodiments, the portion of the game application 104 executed by application host systems 122 of the interactive computing system 120 may create a persistent virtual world. This persistent virtual world may enable one or more players to interact with the virtual world and with each other in a synchronous and/or asynchronous manner. In some cases, multiple instances of the persistent virtual world may be created or hosted by the interactive computing system 120. A set of players may be assigned to or may access one instance of the persistent virtual world while another set of players may be assigned to or may access another instance of the persistent virtual world. In some embodiments, the application host systems 122 may execute a hosting system for executing various aspects of a game environment. For example, in one embodiment, the game application 104 may be a competitive game, such as a first person shooter or sports game, and the host application system 122 can provide a dedicated hosting service for hosting multiplayer game instances or facilitate the creation of game instances hosted by player computing devices. In some embodiments, the application host systems 122 can provide a lobby or other environment for players to virtually interact with one another. Such environments may include environments for conducting transactions between players, such as an auction house or type of environment for facilitating transactions.

2. Gameplay Acquisition System

As described with respect to other systems in FIG. 1, the gameplay acquisition system 130 can communicate with other systems to acquire data associated with a game application and to analyze the data. The gameplay acquisition system 130 can include one or more systems for data acquisition and analysis. For example, the gameplay acquisition system 130 can include a data visualization system 146, a telemetry data acquisition system 134, a search system 136, a video acquisition system 138, a game automation system 142, and a data analysis system 144. These example systems are not intended to be limiting, and the gameplay acquisition system 130 may include fewer or more systems than described. For example, in some embodiments, the interactive computing system may interface with a bug reporting system. In some embodiments, the gameplay acquisition system 130 may include more systems and/or functionalities that facilitate the acquisition of game data and the analysis of a game application.

The gameplay acquisition system 130 computing system 130 and its various systems may be distributed across multiple computing systems. The various systems of the gameplay acquisition system 130 can communicate with each other to obtain and analyze data associated with a game application. For example, a portion of the video acquisition system 138 may be executed by the player computing system 102, while another portion of the video acquisition system 138 may be executed by the interactive computing system 120. The video acquisition system 138 of the gameplay acquisition system 130 may communicate with the video acquisition system 138 of the player computing system 102 to acquire video data. The video acquisition system 138 of the interactive computing system 120 may generate a session ID for a particular game session. The video acquisition system 138 of the player computing system 102 may be a plug-in to the game application 104 and acquire video data of the game's execution. In some embodiments, the video acquisition system 138 may be entirely implemented by the player computing system 102. In some embodiments, the computing device may have a video acquisition system that is independent of the gameplay acquisition system 130 and the game application. For example, a game console may acquire gameplay videos and communicate the acquired video to the data visualization system 146. Some example interactions between various systems of the gameplay acquisition system 130 are further illustrated in FIGS. 2A and 2B. Each system of the gameplay acquisition system 130 is described in more detail below.

a. Video Coordination System

The video coordination system 132 can be configured to coordinate capture of video data and telemetry data associated with gameplay sessions. The video coordination system 132 can be configured to communicate with the game automation system 142 and video acquisition system 138 to coordinate the capture of the data streams from the gameplay session. The coordination system can send the command to video acquisition system to initiate capture of the gameplay session.

A gameplay session may be associated with a start time timestamp and/or an end time timestamp. The start time may be the time when the game application begins recording. The end time may be the time when the recording of the game application is terminated, for example, by a player or by a crash. The gameplay session can have timestamps for each event recorded during the gameplay session. During the gameplay session, the various systems may simultaneously acquire data of the game application. For example, the telemetry data acquisition system may acquire telemetry data of the gameplay session while the video acquisition system acquires video data of the gameplay session.

The gameplay session can be associated with a session ID. The session ID can be unique to a gameplay session. The session ID may be generated by the coordination system or it may be generated by one or more systems described herein, such as, for example, the player computing system 102, application host systems 122, or other systems of the gameplay acquisition system 130, or the like. The session ID may be based on a variety of information such as, for example, an IP address, a timestamp when the game application begins to be executed, information associated with the computing system, an/or other information. The session ID may be used to link data acquired by different systems during the gameplay session. Advantageously, in some embodiments, data acquired by various systems may be further linked together using the timestamps of the gameplay session.

b. Telemetry Data Acquisition System

Telemetry data acquisition system 134 can be configured to acquire telemetry data during a gameplay session. Telemetry data of a game application can be used to identify events that occur during the gameplay session. The telemetry data acquisition system 134 can be configured to record defined events that are triggered during the gameplay session. Telemetry data may include data specific to the game application such as, for example, character's movements, character's positions, character actions (for example, firing a gun, shooting a basketball, and the like), in-game event (for example, an enemy's death, the start of a play, a point being scored), player inputs (for example, buttons pressed), in-game camera position, character dialogue, and the like. The telemetry data may also define one or more segments within a game application. A segment can define a start time and an end time. A segment can include all events that trigger within the start time and the end time. For example, in a football game, the segments may include individual plays and quarters.

In some embodiments, the telemetry data acquisition system can record a defined event that is triggered occur when defined criteria have been satisfied. For example, an event may be scripted to trigger only after the movement speed of a character within the game increases above a threshold. Each event can have an event identifier (ID), where the same types of events have the same event ID. For example, in a football game, each touchdown has the same event ID. The event ID can be used to search for events in any gameplay session for the game application.

In some embodiments, the telemetry data acquisition system 134 may also acquire system information associated with operation of the game application. The system information may include performance data such as, frame rate, CPU or memory utilization rate, machine on which the game application is executed, and the like.

Telemetry data can be stored in a variety of database formats. The telemetry data can be transformed into statistics for analyzing and debugging the game application. The telemetry data may be transformed or organized to show various metrics or statistics associated with a game application, such as, for example, average completion time as a function of individual game level, average weekly bug rate, revenue per day, number of active players per day, and so on. These statistics can sometimes be referred to as game metrics.

Telemetry data acquisition system 134 may associate telemetry data acquired during a gameplay session with the session ID. The telemetry data can be associated with the video data using the session ID.

c. Video Acquisition System

The video acquisition system 138 can record execution of a gameplay session of the game application 104. The video acquisition system 138 can record the video data and audio data output by the video game application as one or more data streams. For example, the video acquisition system 138 may gather video data such as, for example, moving visual images of the gameplay (for example, object's movements), audio data (for example, sound of bombing or shooting), system notifications, dialogues, interactions with items, messages among the players, player commentary, web cam footage or the like. The video acquisition system 138 can record the screen of the player computing system 102 during a gameplay session. In some embodiments, the video acquisition system 138 may be configured to acquire video data associated with multiple views of a gameplay session. For example, a game application may record a plurality of video capture streams within a gameplay session even though only a single view is displayed on the player computing system at a given time.

The video acquisition system 138 can be configured to interface with different types of player computing systems. Each type of gaming console and operating system can have different types of interfaces that are used to record a gameplay session. In some embodiments, the console may already include video recording software that can record the gameplay session and provide it to the video acquisition system 138. In some embodiments, the video acquisition system 138 can generate instances, such a virtual machine instance, for each player computer system that are responsible for interfacing with the player computing system and retrieving the gameplay session. In some embodiments, video and audio data may be acquired by separate software and/or hardware.

In some embodiments, the data acquired by the video acquisition system 138 may be streamed live to the data visualization system 146 and stored in temporary storage prior to analysis and encoding by the video processing system 140. For example, the video acquisition system 138 may gather video data and transmit the video data to the interactive computing system 120. The video acquisition system 138 may record the gameplay session, store the recorded video, such as in data store 126, and transmit the recorded data to other computing systems at a later time.

As described with reference to telemetry data acquisition system, the video data may be linked to a gameplay session based on the session ID. During the gameplay session, the video data acquired by the video acquisition system 138 may be associated with a start timestamp and/or an end timestamp. The start timestamp can be an absolute value based on the time that the gameplay session was initiated (such as, 8:30:00.05 am). Each timestamp recorded during the gameplay session can also be based on the absolute time. For example, the end timestamp may be 8:31:00.43 am. In some embodiments, timestamps may be generated and/or expressed that are relative to the start timestamp of the video. For example, a one minute video of the gameplay session may have the timestamps between 0 seconds and 60 seconds.

In between the start timestamp and end timestamp, the video data may be divided into a plurality of frames. The timestamps may be used to refer to specific frames within the video. In some embodiments, the gameplay acquisition system 130 can associate an event with certain timestamps of the video data. The event can further be associated with other data, such as telemetry data, in the gameplay session using the session ID and timestamps. For example, the gameplay acquisition system 130 may record a shooting game application in a gameplay session. During a shooting game, an event may trigger be when a player shoots a weapon. The gameplay acquisition system 130 can identify the timestamp when this event occurs. The gameplay acquisition system 130 can associate video frames and telemetry data for this event based on the timestamps.

d. Video Processing System

The video processing system 140 can be configured to encode video and audio data associated with gameplay sessions for final storage in a data store (such as, data store 124). The video processing system 140 can retrieve a completed gameplay session video from a temporary storage location and encode the video into a standard file format, such as, for example, an MP4 file. The video processing system can be configured to curate video files within the data store and delete videos that have been in the data store for a defined period of time. The video processing system 140 can associate each video with a session ID associated with the gameplay session.

e. Game Automation System

The game automation system 142 can be a system configured to automate gameplay of a gameplay session using an artificial intelligence (AI) system. The game automation system is optional component and can be used during automated testing. The game automation system 142 can include one or more virtual game agents that are configured to play the video game application 104. A game agent can have certain characteristics. A game agent can automatically make decisions at various states of the video game application 104. The game automation system 142 may have various types of agents with each type of agent being associated with defined characteristics. In some embodiments, the game agent's characteristics may include a level (also referred to as AI level). For example, the AI level may include qualitative grades such as low, medium, or high or quantitative grades, such as for example, in a scale of 1 to 10 with 10 being the hardest (or easiest). The characteristics of the agents may also include personas where agents may be trained to mimic the choices of a person at a particular state.

At each state within the video game application, a game agent in the game automation system 142 can make an action based on its operational characteristics. The action may be a random action chosen from a pool of available actions at that state, a predefined option, or an informed action based on the available information (such as, for example, data received in the current and/or previous gameplay sessions).

In some game applications, multiple game agent systems may be used to simulate a gameplay. For example, in a football video game, each game agent may play a team. As another example, in a single player turn-based game, a game agent may simulate the gameplay as if it is a human. Each game automation system 142 may include game agents with similar types or characteristics. For example, one game automation system 142 may include learning agents while another game automation system 142 may include random agents. A game automation system 142 may also include game agents with mixed types or characteristics. For example, the game automation system 142 may include static agents for farming and learning agents for attacking or defending.

The game automation system 142 can execute within the video game application 104 by interfacing with the API of the video game application 104. For example, a game agent of the game automation system 142 can perform an action in the video game by calling the API associated with the action. Additionally or alternatively, the game automation system 142 can interact with the video game application 104 by simulating an action of a peripheral device. For example, the game automation system 142 (and/or the game agents of the game automation system 142) can simulate a mouse click, a mouse movement, a keyboard stroke, or other movements of a game controller. The graphics of the video game application 104 may not be rendered when the game automation system 142 interacts with the video game application 104 via the API. When the game automation system 142 executes within the video game application 104 by simulating an action of a peripheral device, the video game application 104 may be configured to render graphics. For example, a game agent may be configured to only click on a certain spot of the screen.

The game automation system 142 can include a game automation schedule that can be used to coordinate the automation of gameplay sessions on various computing systems 102. The automation schedule can be used to control the parameters used for each automated gameplay session, such as, for example, the type of agent, the duration of the gameplay session, the level within the game application, the number of virtual agents within the game, and any other characteristics associated with an automated gameplay session. The automated gameplay session may coordinate and provide instructions to initiate hundreds of different systems using different architectures (for example, an XBOX console or a Sony PlayStation console) and various types of games. The automation schedule can be configured by users to acquire specific types of gameplay data associated with a game application. For example, a game application may need to validate and verify various aspects of the game during quality assurance testing. The quality assurance schedule may include validation of audio recordings at specific points within the game. The automation schedule may be configured to execute the game applications 104 so that the specific gameplay sessions are recorded that include the required audio recordings.

As further described with reference to the telemetry data acquisition system 134, as a game automation system 142 plays the video game application 104, the events generated by the game agent's actions as well as the results of the actions can be recorded by the telemetry data acquisition system 134. In the illustrated example, only one game automation system 142 is shown, the computing system 102 can simulate a gameplay session by running multiple game agents systems 108 in series or in parallel by running multiple instances of the video game or multiple agents within a video game.

f. Data Analysis System

The data analysis system 144 can analyze data associated with a game application and generate game metric information. The data analysis system 144 may perform data analyses after a gameplay session. For example, the data analysis system 144 can obtain telemetry data from the data store 124. The data analysis system 144 can generate reports based on the acquired telemetry data.

The data analysis system 144 can analyze data across multiple gameplay sessions. The data analysis system 144 may retrieve data from the data store 124 associated with multiple session IDs. In some implementations, other identifiers may be used to obtain data. The data analysis system 144 may use event ID and/or timestamps in a recorded video to retrieve data.

The data analysis system 144 can communicate with the data visualization system 146 and present the game metrics data in a variety of formats such as, for example, graphs (for example pie charts, heat maps, tables, line graphs), tables, word descriptions, or the like. In some embodiments, the data analysis system 144 may contain multiple modules where each module is for a certain type of analysis. For example, one module may be used to generate graphs for game metrics data. These modules may be implemented as plugins to the game application 104 and/or to the data visualization system 146. The user can customize the data analysis system 144, for example, by adding or removing one or more modules.

g. Search System

The search system 136 can communicate with various systems of the gameplay acquisition system 130 and/or the interactive computing system 120. For example, the search system 136 may communicate with the data visualization system 146 to receive one or more search criteria. The search system can communicate with data store 124 and look up information based on the search criteria. The search system 136 can transmit information obtained from the data store 124 to the data visualization system 146 for the user to view.

The search system 136 can look for one or more events in a gameplay session. The search system 136 can also look for information such as specific types of events, across multiple gameplay sessions. For example, the search system 136 can search for information associated with every touchdown during the last two minutes of a football game. The search system 136 can also search for all recorded videos in the past two days.

h. Data Visualization System

Figure 5:
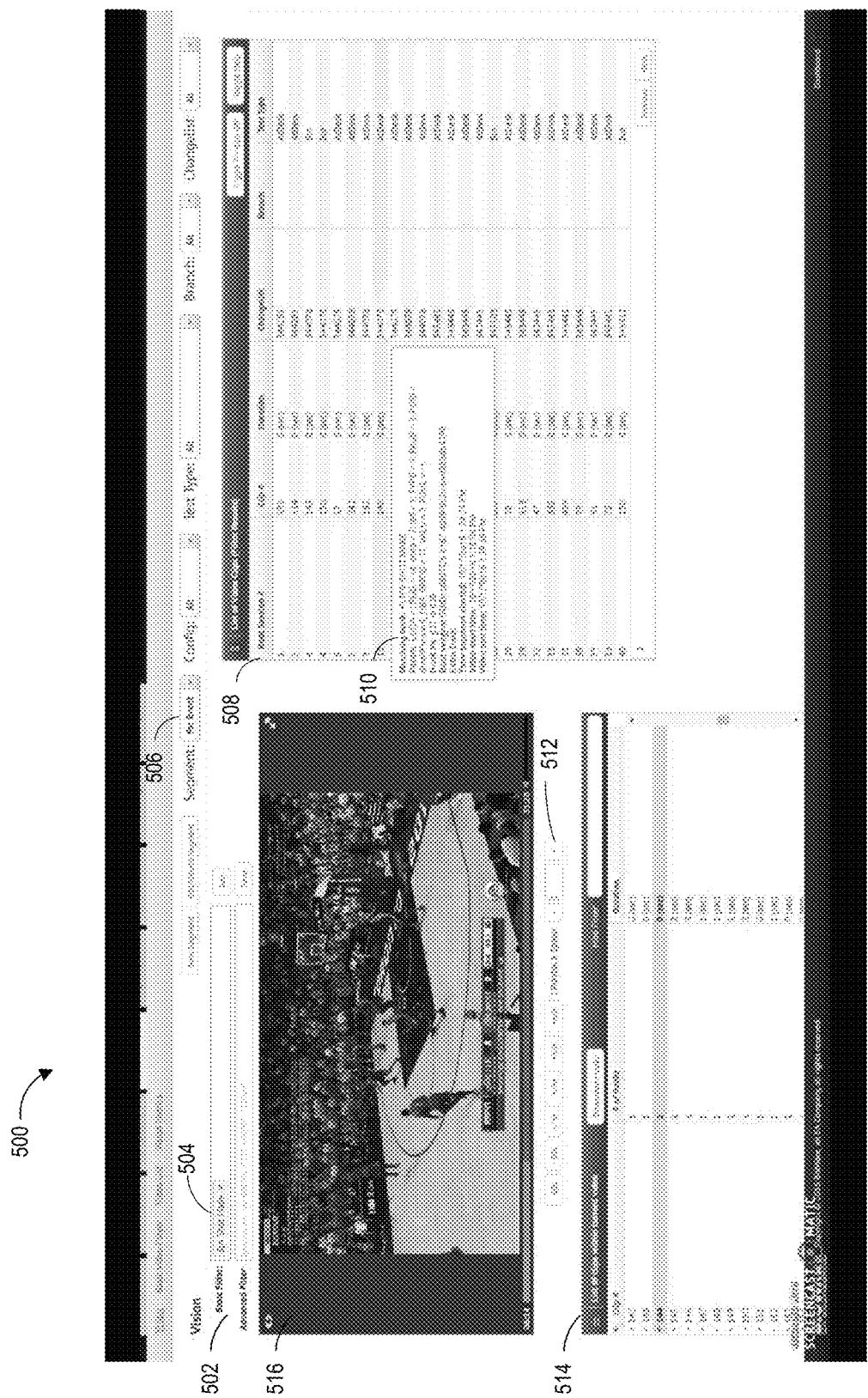
FIG. 5 illustrates an example embodiment of a user interface implementing an output of the data visualization system.

The data visualization system 146 can generate a user interface for a user to view data analyses associated with the game application 104. The user interface may include game telemetry data, a recorded video of a game session, a filtering tool, a search tool, or the like. The filtering tool and/or the search tool may be configured to receive user input and filter data based on the user input. The user interface may be rendered through a web interface (such as a webpage), and/or on an application locally installed on a computing device. Example embodiments of a user interface of the data visualization system are illustrated in FIGS. 5 and 6.

The data visualization system 146 may generate user interface data using one or more user interface templates. With reference to FIG. 2, a user interface template can have multiple modules, such as, for example, an event information module 250, a visual game information module 270, a video module 280, an interface control module 260, or the like. The data visualization system 146 may populate the modules using information received from other systems of the gameplay acquisition system 130.

3. Data Store

The interactive computing system 120 can include a data store 124. The data store 124 can be configured to store data acquired by other systems, such as, for example, telemetry data, video data, user data, or the like. The data store may be distributed across multiple computing devices (see for example computing device 700 in FIG. 7). In some embodiments, the data store 124 may be network-based storage system where data may be stored in different locations.

B. Player Computing System

The player computing system 102 may include hardware and software components for establishing communications over a communication network 108. For example, the user computing system 102 may be equipped with networking equipment and network software applications (for example, a web browser) that facilitates communications via one or more networks (for example, the Internet or an intranet). The player computing system 102 may have varied local computing resources such as central processing units and architectures, memory, mass storage, graphics processing units, communication network availability and bandwidth, and so forth. Further, the player computing system 102 may include any type of computing system. For example, the player computing system 102 may include any type of computing device(s), such as desktops, laptops, game application platforms, virtual reality systems, augmented reality systems, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the player computing system 102 may include one or more of the embodiments described below with respect to FIG. 9.

1. Game Application and Host Application System

The player computing system 102 is capable of executing a game application 104, which may be stored and/or executed locally and/or in a distributed environment. In a locally executed game application 104, generally, the game does not rely or utilize an external computing system (for example, the interactive computing system 120) to execute the game application. In some instances, a locally executable game can communicate with an external server to retrieve information associated with the game, such as game patches, game authentication, clouds saves, or other features. In distributed game applications, the player computing system 102 may execute a portion of a game and the interactive computing system 120, or an application host system 122 of the interactive computing system 120 may execute another portion of the game. For instance, the game may be a massively multiplayer online role-playing game (MMORPG) that includes a client portion executed by the player computing system 102 and a server portion executed by one or more application host systems 122. For the present discussion, the type of game application 104 can be a locally executable game, a distributed application, or an application that includes a portion that executes on the player computing system 102 and a portion that executes on at least one of the application host systems 122.

2. Data Acquisition System

Data acquisition system 150 may be used to acquire data associated with a player and/or game application 104. Data acquisition system 150 can interface with the system of the interactive computing system such as the video acquisition system 138 and telemetry data acquisition system 134 in order to transfer data during gameplay sessions. The data acquisition system 150 can acquire telemetry data of a game application (using telemetry data acquisition system 134), video data of the gameplay (using video data acquisition system 138), and/or other types of data.

The various systems of the data acquisition system 150 may be implemented by hardware, software or a combination. For example, the systems can be software plug-in to the game application 104, host application system 106, and/or application host systems 122. One or more of the systems can also be a standalone application which can communicate with the game application 104, host application system 106, and/or application host systems 122.

C. User Computing System

The user computing system 103 can be implemented by a computing device as described with reference to FIG. 7. The user computing system 103 can comprise the data visualization system 146. The user computing system 103 can communicate with the player computing system 102 and/or interactive computing system 120 through a network 108. In some embodiments, the user computing system 103 may be a part of the player computing system 102 or the interactive computing system 120.

The data visualization system 146 of the user computing system 103 can include a user interface. As described with reference to FIG. 2, the user interface can display one or more game metrics. The game metrics may be shown in various formats such as tables, word descriptions, graphs, or the like. The user interface can display a game environment map such as a player's location or movement direction at a certain timestamp. The user interface can show a video acquired by the video acquisition system 138 during a gameplay.

The data visualization system 146 may be implemented in a variety of ways such as, for example, a website, a mobile page, a plug-in to an application (such as for example, a debug application, a game application, or a host application), and so on. The data visualization system 146 will be described in more detail below.

D. Other Considerations

Although the various systems are described separately, it should be noted that one or more of these systems may be combined together. For example, the user computing system 103 may be combined with player computing system 102. In another example, the search system 136 may be a part of the data visualization system 146. Additionally, one or more of the systems may be executed by the same computing device (see for example, computing device 10 in FIG. 7). For example, the administrative computing system 103 may be executed on the same computing device as the player computing system 102.

On the other hand, one or more systems may be executed by multiple computing devices. For example, a portion of the data visualization system 146 may be implemented by a player's personal computer while another portion may be implemented by a server.

Example Embodiments of Gameplay Session Capture Process

Figure 2A:
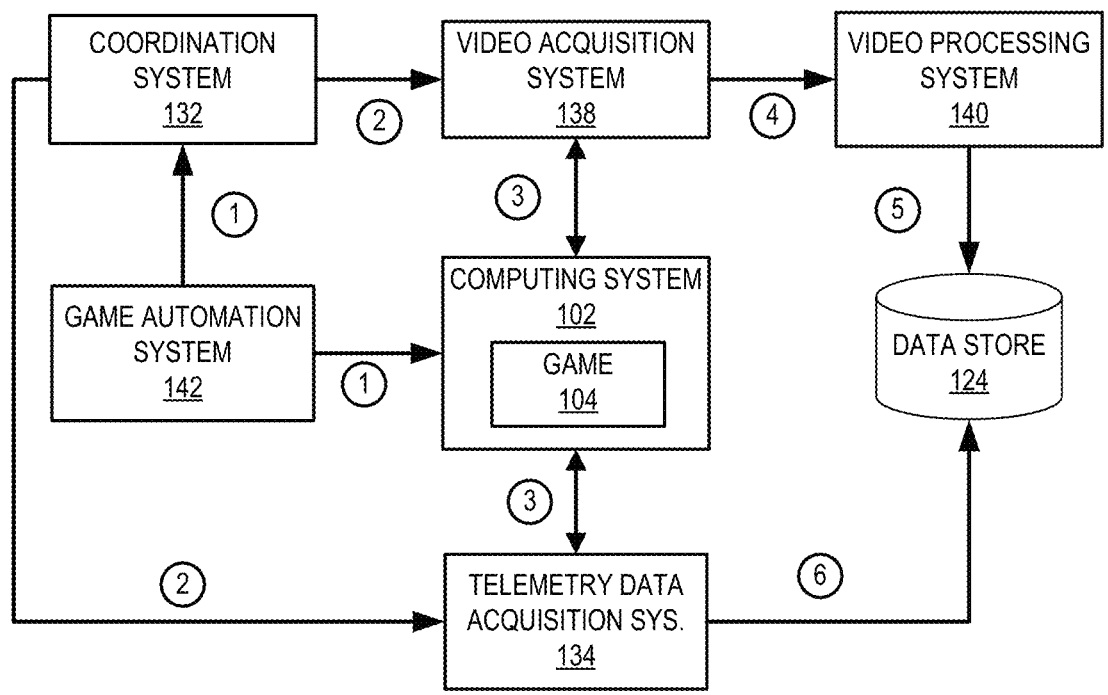
FIGS. 2A and 2B illustrates an embodiment of interactions of various systems of a gameplay acquisition system 130.
Figure 2B:
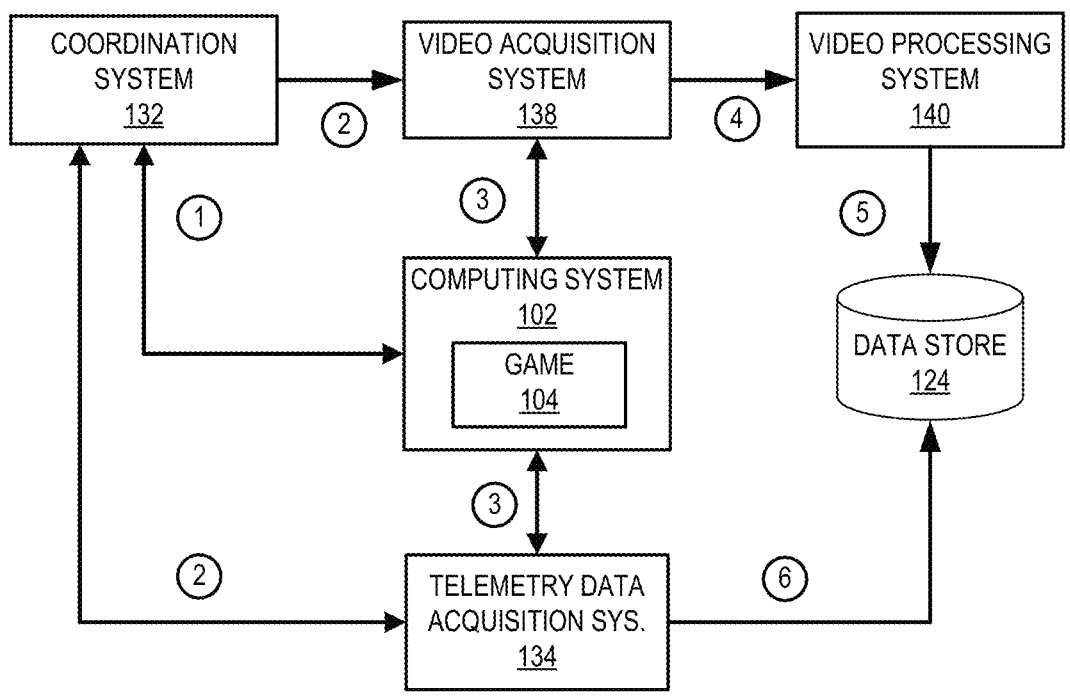

FIGS. 2A and 2B illustrate embodiments of interactions between the various components of the gameplay acquisition system 130 and the player computing system when acquiring data streams of a gameplay session. FIG. 2A illustrates an embodiment with the game automation system 142 that would be used during automated testing of the game application. FIG. 2B illustrates an embodiment with the game automation system 142 that would be used during manual testing of the game application.

With specific reference to FIG. 2A, at (1), during automated testing, the game automation system 142 can communicate with the computing system 102 in order to initiate a gameplay session of the game application 104. The game automation system 142 can initiate the gameplay session in accordance with a defined automation schedule, which can control the parameters used for the automated gameplay session, such as, for example, the type of agent, the duration of the gameplay session, the level within the game application, the number of virtual agents within the game, and any other characteristics associated with an automated gameplay session. Though, the illustrated embodiment includes only a single computing system, the game automation system can control a plurality of computing systems. The GAS can also communicate with the coordination system 132 to indicate that the gameplay session is being initiated.

At (2), the coordination system 132 can provide instructions to the video acquisition system to initiate capture of the video stream and to the telemetry data acquisition system 134 to initiate capture of the telemetry data stream. In some embodiments, the coordination server can associate and/or instantiate one or more a virtual machine in order to capture the data from the gameplay session. For example, a virtual machine may be associated with the video acquisition system 138 and a virtual machine may be associated with the telemetry data acquisition system 134. In some embodiments, the coordination system 132 can communicate directly with the computing system to initiate capture of the gameplay session. In such embodiments, the computing system 102 may have a video acquisition system that is integrated into the computing system.

At (3), the video acquisition system 138 and the telemetry data acquisition system 134 can acquire video data streams and telemetry data streams, respectively. The video acquisition system 138 can record the video data and audio data output by the video game application as one or more data streams. For example, the video acquisition system 138 may gather video data such as, for example, moving visual images of the gameplay (for example, object's movements), audio data (for example, sound of bombing or shooting), system notifications, dialogues, interactions with items, messages among the players, player commentary, web cam footage or the like. The telemetry data acquisition system 134 can be configured to record defined events that are triggered during the gameplay session. Telemetry data may include data specific to the game application such as, for example, character's movements, character's positions, character actions (for example, firing a gun, shooting a basketball, and the like), in-game event (for example, an enemy's death, the start of a play, a point being scored), player inputs (for example, buttons pressed), in-game camera position, character dialogue, and the like. The telemetry data may also define one or more segments within a game application. The telemetry data can be associated with the specific gameplay session by a session ID.

At (4), the video processing system 140 can encode video and audio data associated with gameplay sessions for final storage. The video processing system 140 can retrieve the completed gameplay session video from a temporary storage location and encode the video into a standard file format, such as, for example, an MP4 file.

At (5), the processed and encoded video file of the gameplay session is transferred to a data store, such as data store 124, for final storage. At (6), the telemetry data associated with the gameplay session is stored in a data store, such as data store 124, for storage. The telemetry data and the video data can be stored in different data stores. The telemetry data and the video data can be accessed by the other systems, such as the data visualization system 146.

With specific reference to FIG. 2B, at (1), during manual testing, the coordination system 132 can communicate directly with computing system in order to coordinate acquisition of the video and telemetry data streams during the gameplay session. In some embodiments, the computing system can have a coordination system module or interface that can be accessed by a manual tester in order to initiate gameplay session. The other interactions are substantially the same as those described above with reference to FIG. 2A.

Example Embodiments of Gameplay Telemetry Data

Figure 3A:
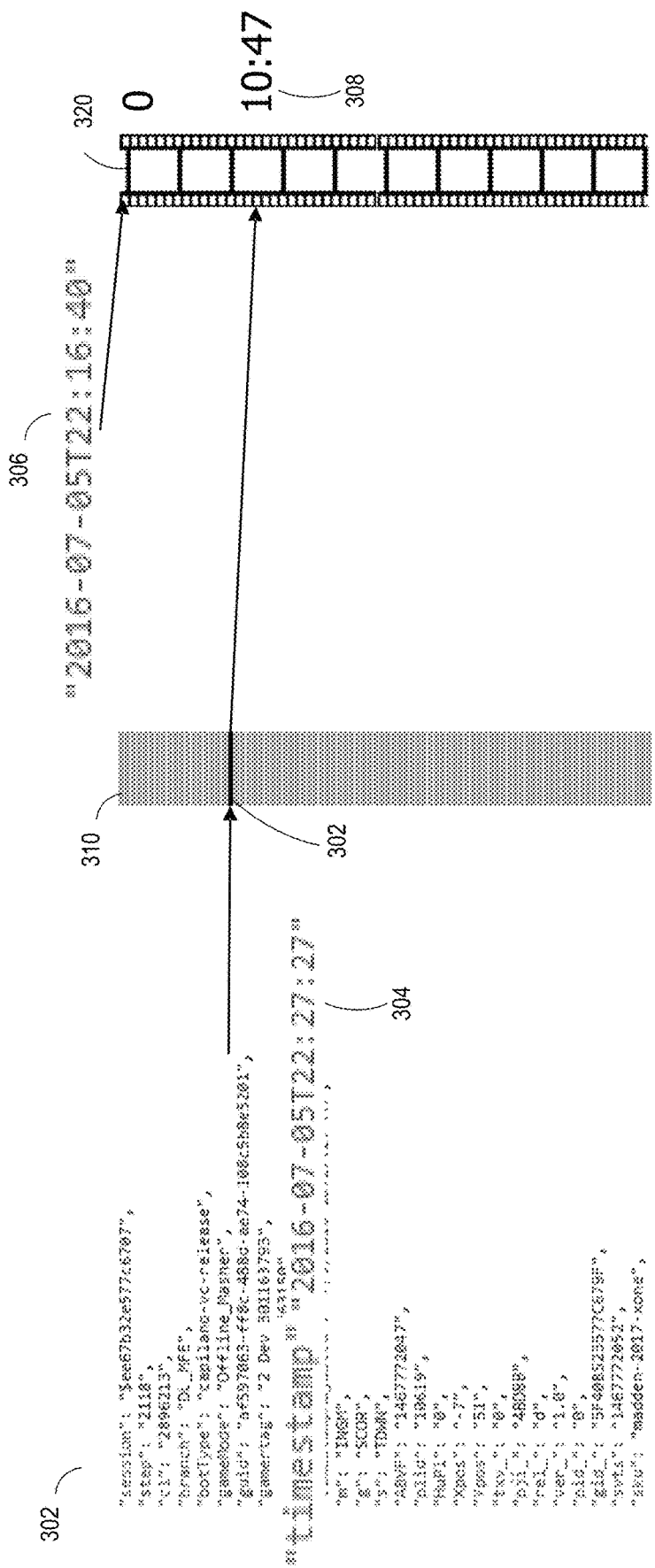
FIGS. 3A, 3B, and 3C illustrate embodiments of telemetry data and video data associated with a gameplay session.
Figure 3B:
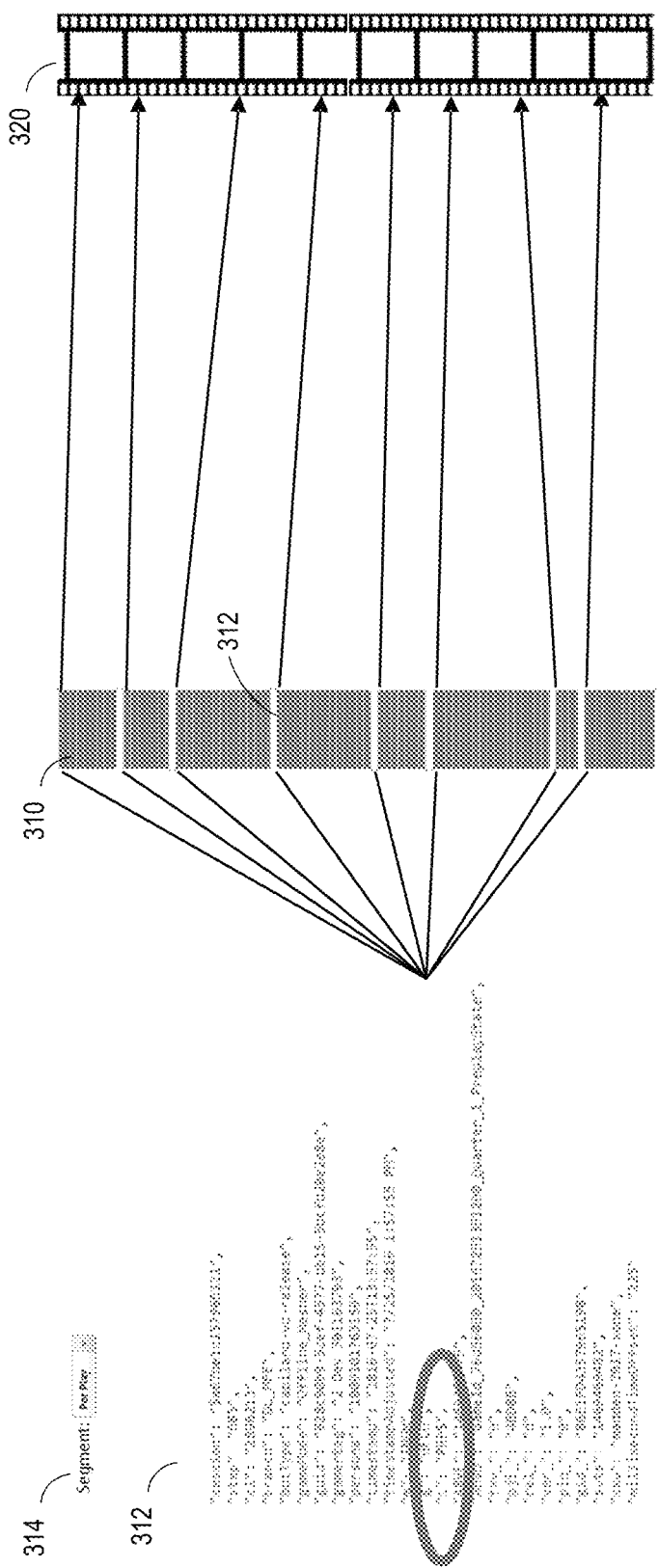
Figure 3C:
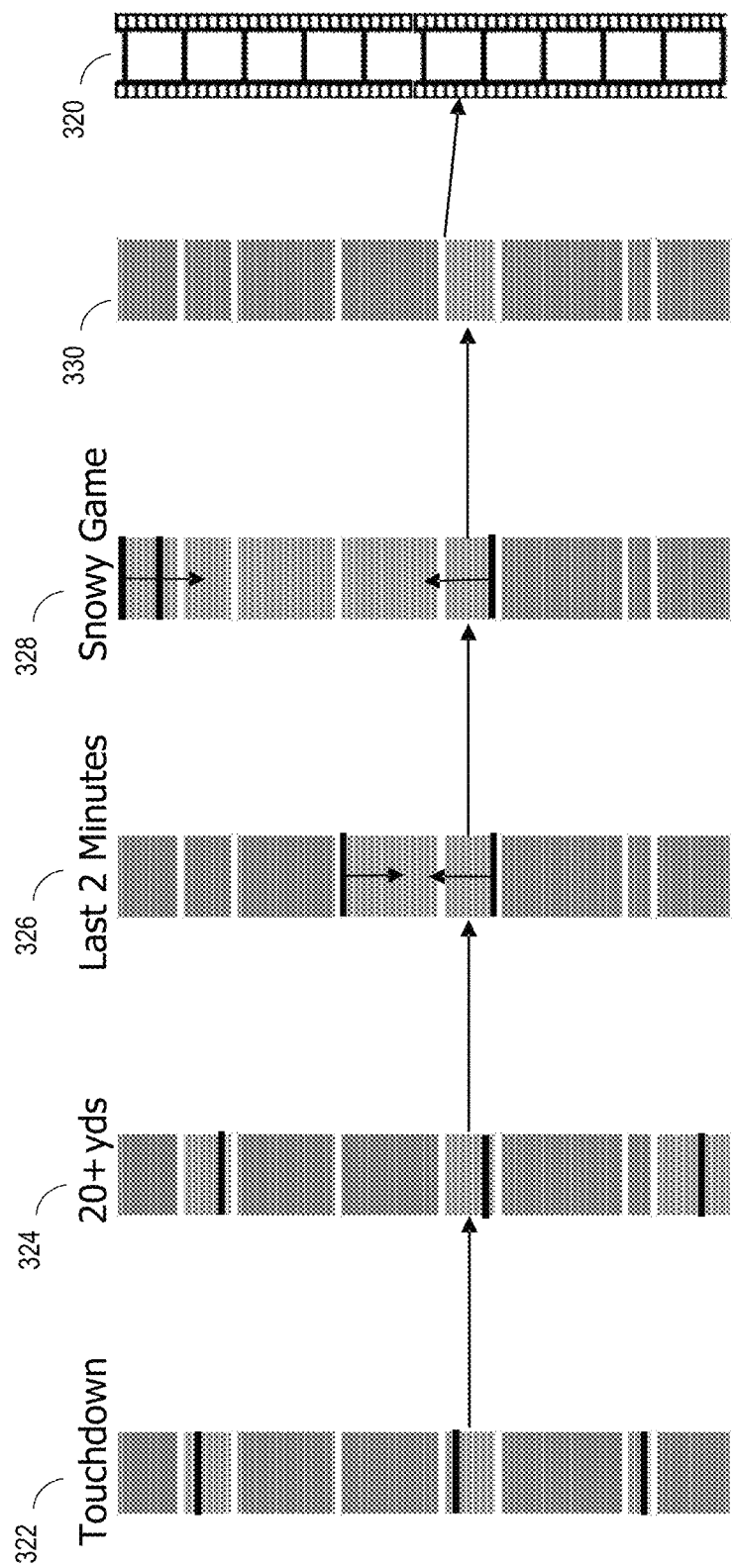

FIGS. 3A, 3B, and 3C illustrate embodiments of telemetry data and video data associated with a gameplay session. FIG. 3A provides an example embodiment of data for an event 302 recorded during the gameplay session. A timestamp 304 for the event 302 provides the time when the event was recorded during the gameplay session. In this embodiment, the timestamp is an absolute time. An illustration of the sequence of events 310 are illustrated in sequential order. The event 302 corresponds to the video data 320. The playback time 308 of the identified event 302 within the video can be determined based on the video start timestamp 306 and the event timestamp 302. In this instance, the playback time 308 of the event 302 is 10 minutes and 47 seconds after the start of the video.

The event data can be specific to the game application such as, for example, character's movements, character's positions, character actions (for example, firing a gun, shooting a basketball, and the like), in-game event (for example, an enemy's death, the start of a play, a point being scored), player inputs (for example, buttons pressed), in-game camera position, character dialogue, and the like.

In some embodiments, the telemetry data acquisition system can record a defined event that is triggered to occur when defined criteria have been satisfied. For example, an event may be scripted to trigger only after the movement speed of a character within the game increases above a threshold. Each event can have an event identifier (ID), where the same types of events have the same event ID. For example, in a football game, each touchdown can have the same event ID. The event ID can be used to search for events across gameplay sessions for a game application. The event data can be any type of data associated with a triggered event within the game application.

FIG. 3B provides an illustrative example of data for a segment 312 captured during a gameplay session. A segment 312 may also be referred to as a segment event. A gameplay session may be divided into one or more segments. A game application can include different types of segments. For example, in a football game, the segments may be a play or a quarter. In some embodiments, each event can be a segment. A segment can define a start time. In some embodiments, the segment may also include an end time. The segment can be used to define searchable groupings of data within the game application. In some embodiments, a segment may include all events that trigger between a start time and an end time of the segment. The events may include a reference to segment an associated segment. A segment start timestamp can be used to identify start time for replay of the video file. The telemetry data acquisition system and/or the search system can identify the closest segment that occurs prior to the triggering of an identified event. The start timestamp of the segment can be used as a start time for viewing the video. For example, in a football game, the start time of a play in which an identified event occurs can be used as the start time for viewing a playback of the gameplay session.

FIG. 3C provides an illustration of a portion of events that occurred during a gameplay session. The use of segments can be used to identify a replay time of a video from a gameplay session. In the illustrated example, each column identifies search criteria being used to search for the occurrence of specific events within a gameplay sessions. In the illustrated example, the game is a football game. The search system can use the event data to do complex searches in order to identify occurrences of events, characteristics associated with the events, and other event data associated with the gameplay session. In this example, the first column 322 identifies an all the touchdown events that occurred during the gameplay session, which was three. The search system can also identify segments associated with the event. The second column 324 identifies plays that resulted in 20 or more yards being gained by the player, which there were three. Two of the three plays resulted in touchdowns. The third column 326 identifies segments of the game that were played within the final two minutes of a quarter. The fourth 328 column identifies segments of the game that were played in snowy conditions. The fifth column 330 provides the results of segments that satisfy the identified search criteria. The search criteria only identified a single segment. The matching segment can be output by the search system within an interface within the data visualization system.

Example Embodiment of a Data Visualization System

Figure 4:
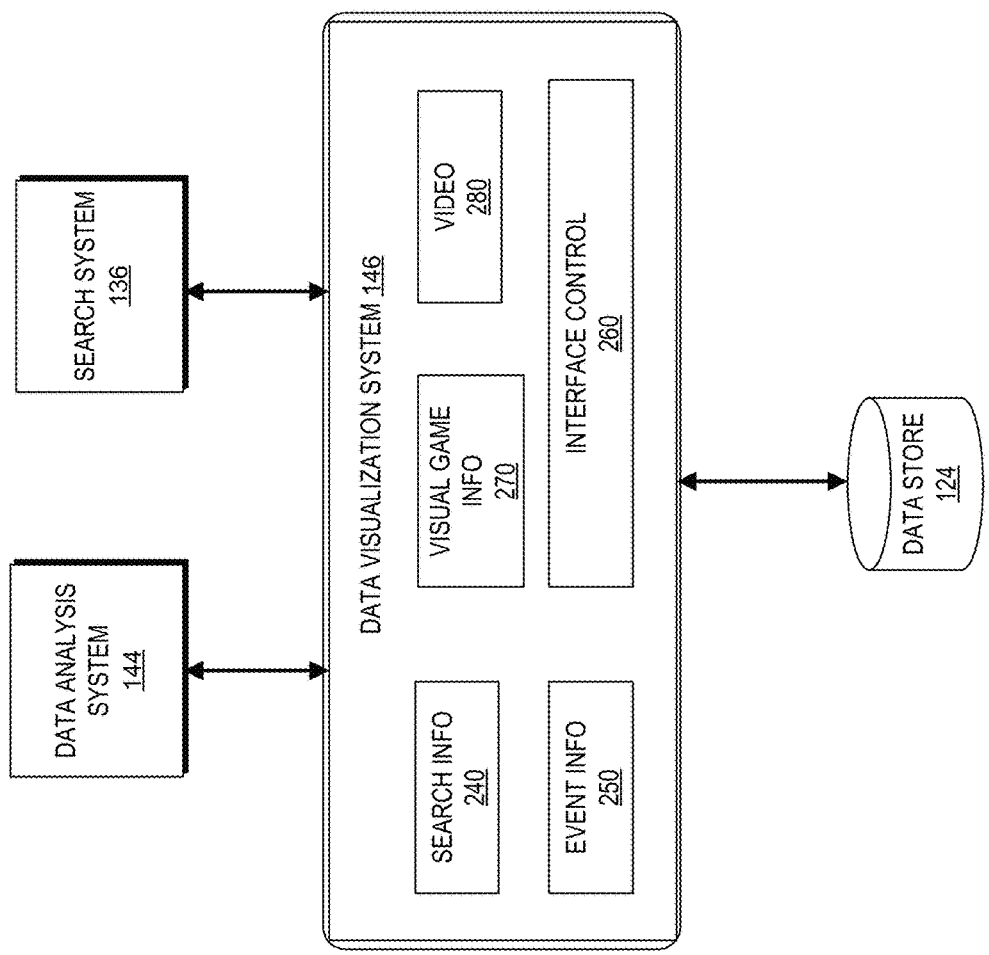
FIG. 4 illustrates an embodiment of a data visualization system.

FIG. 4 illustrates an embodiment of data visualization system and various other systems. As shown in the illustrated embodiment, the data visualization system 146 can communicate with various systems such as, for example, a search system 140, a data analysis system 144, one or more databases (for example, database 124), and/or other systems. The data visualization system 146 can generate user interface data and transmit the user interface data to be displayed by a computing device (for example, the computing device described with reference to FIG. 9). Each of the systems may be part of a game application (such as, for example, a plug-in of the game application), a host application, a webpage, or a standalone application.

In the illustrated embodiment, the data visualization system 146 includes, for example, an event information module 250, a visual game information module 270, a video module 280, an interface control module 260, and so on. These modules can be used to display information received from systems herein.

Although the examples in FIG. 4 are described with reference to various systems and modules, these examples are not limiting. The system 200 may include more or fewer systems and/or modules. The data visualization system 146 may include another module that is used to display data generated by the data analysis system. In some implementations, one or more modules may be a part of another module.

The data visualization system 146 can communicate with data analysis system 144 and display game metrics in a variety of formats such as, for example, graphs (for example pie charts, heat maps, tables, line graphs), tables, word descriptions, and so on. The data visualization system 146 may display such data analyses using one or more modules such as debug information module 240, event information module 250, or the like.

In some embodiments, the data visualization system 146 may include one or more plug-ins for rendering game metric analyses in certain formats. For example, the data visualization system 146 may have a plug-in that can allow the data visualization system 146 to display game data using a heatmap.

The data visualization system 146 can include a user interface control module 260 which allows the user to search and filter data. The user interface control module 260 can include a search tool allowing a user to input search queries and receive data based on the search queries. For example, the user may provide search terms in a search query. The interface control module 260 can communicate an event ID to the search system 136. The data visualization system 146 can receive from the search system 136, data such as, for example, telemetry data, video data associated with the event ID. The data visualization system 146 can then display the video data in the video module 280 and telemetry data in the debug information module 240.

The interface control module 260 can also include various options for generating search queries. The search system can be configured to include defined search terms that are associated with events within a game application. The defined search terms can be plain English versions of events within the game application. The user can input the plain English terms in lieu of a specific event ID. A filtering tool can allow a user to choose how the user would like the search results returned. For example, the user can select a type of segment that can be used to parse the events. The filtering tool can allow the user to select between one or more sets of data the user is interested in, such as data associated with different types of testing (such as manual or automated testing). The filtering tool may be applied to various types of data such as, for example, game metrics data, video data, telemetry data, or the like. The user interface control module 260 may display one or more options from which the user can choose for filtering. For example, the options may include, timestamps, events, session IDs, segment types, and so on. The user interface control module 260 can also allow the user to directly input filtering criteria using specific the exact event IDs. In some embodiments, the search system can provide a system for generating scripted search queries. For example, a quality assurance program may have a defined battery of test results that need to be analyzed. The scripted search queries can be used to generate searches associated with each of the requirements for the specific quality assurance tests, rather than having the user generate the entire search query each time.

In some embodiments, the user may input a query which causes the data visualization system 146 to receive data associated with multiple gameplay sessions. For example, the user may request a list videos associated with a specific gameplay event (such as a specific boss fight) in the past two days. The data visualization system 146 may receive the session IDs and/or data associated with the list of videos requested by the user. The search system may identify a segment associated with each event that satisfies the search query.

The data visualization system 146 can display the video data acquired by the video acquisition system 138. The data visualization system 146 can display the video data in the video module 280. As described with reference to FIG. 1, the video may include one or more timestamps associated with certain events. The user may choose to watch the video beginning at a timestamp associated with one of the events. The data visualization system 146 may display raw telemetry data acquired by the telemetry data acquisition system 134. In some embodiments, the data acquisition system 132 may display telemetry data processed by other systems such as, for example, data analysis system 144.

Examples Embodiments of User Interfaces

Figure 6A:
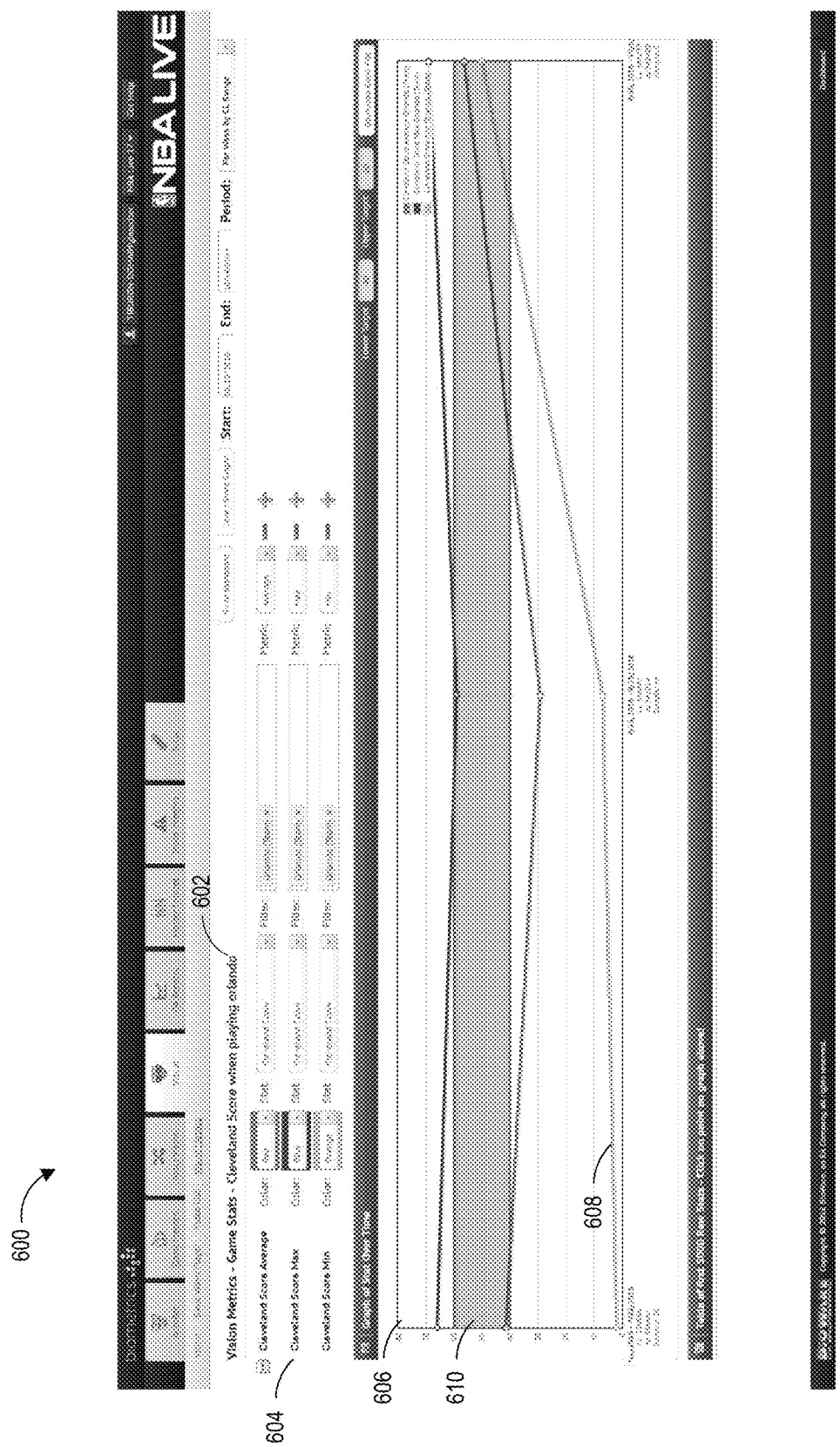
FIGS. 6A and 6B illustrate example embodiments of user interfaces illustrating an analysis of gameplay metrics of aggregated telemetric data.
Figure 6B:
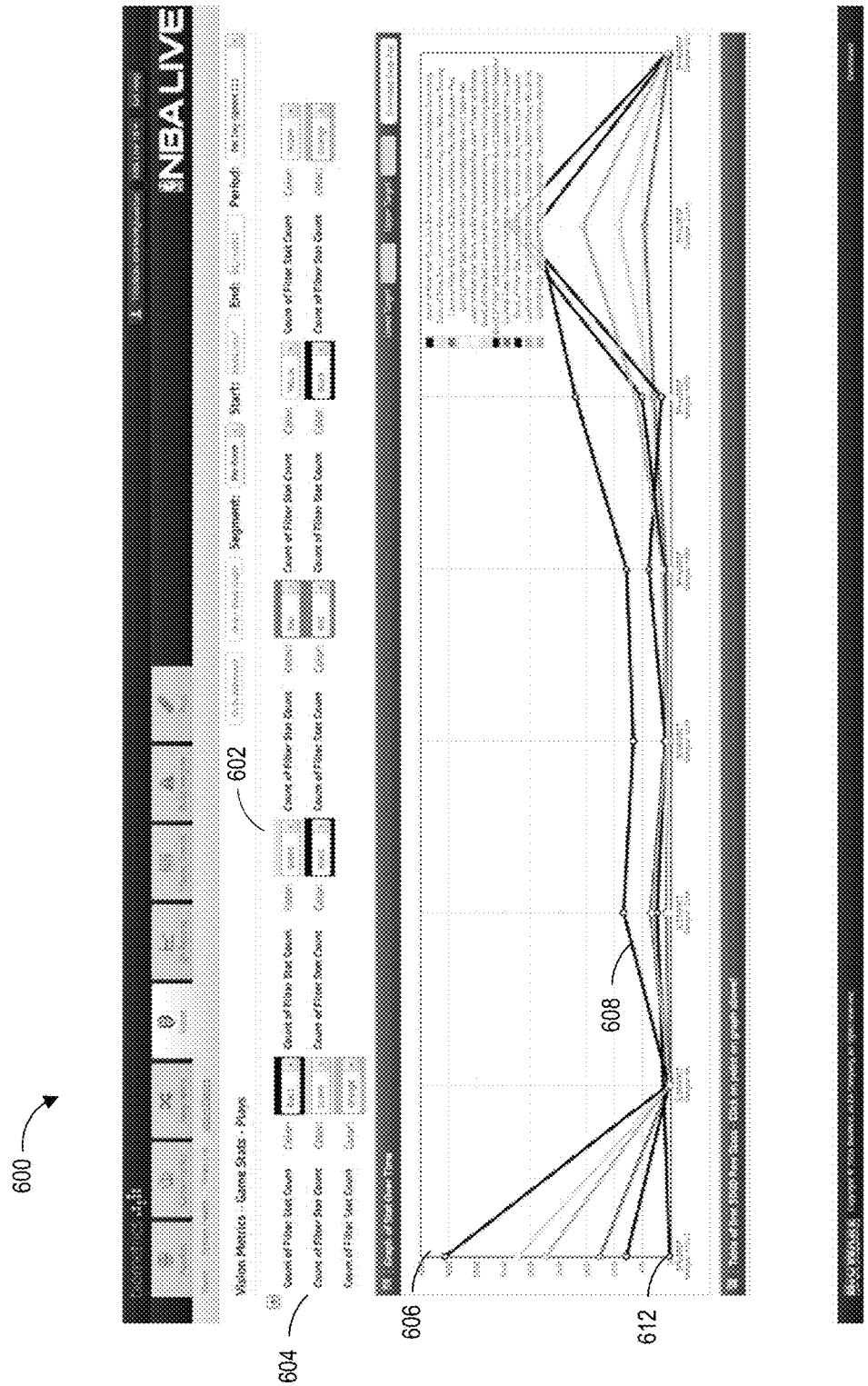
Figure 7:
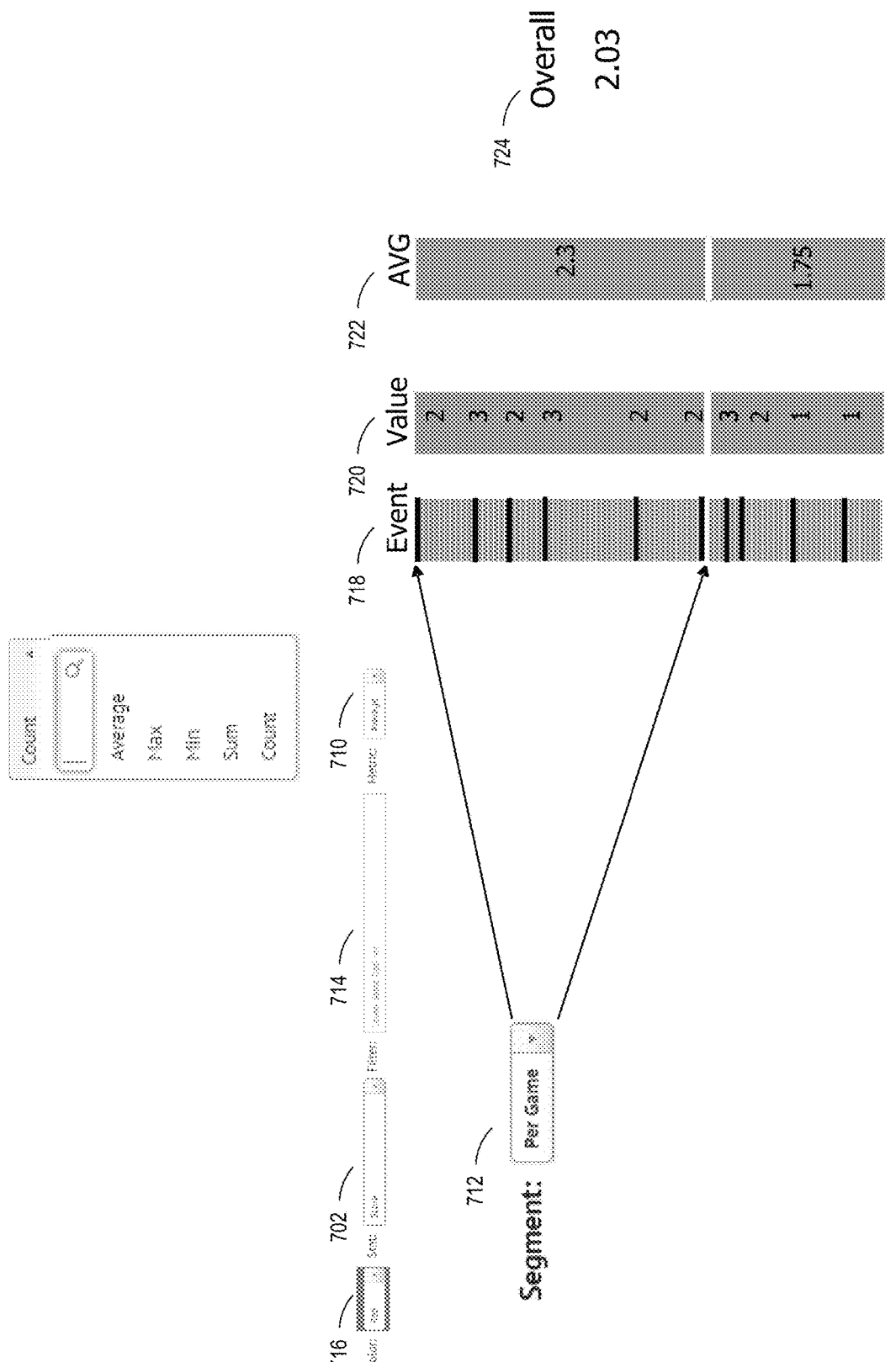
FIG. 7 illustrates an embodiment of an analysis of aggregated telemetric by the data analysis system.

FIGS. 5, 6, and 7 are examples of user interfaces implementing outputs of the data visualization system. The user interface may be a webpage or an application configured to be output on a computing device, such as user computing device 104. Each of the user interfaces shown includes one or more user interface controls that can be selected by a user, for example, using a browser or other application software. The user interface controls shown are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, or keyboard input, among other user interface input options.

With specific reference to FIG. 5, the user interface 500 provides a plurality of search filters 502. The search filters can be populated with one or more search terms 504. The search terms can be automatically identified based on predefined search terms, such as plain English search terms or script-based search queries. The user can combine search terms as desired. In some embodiments, the search filters can provide for a user to input any term or event ID. The system may include one or more filters 506 that provide functionality for filtering the type of data search, such as, for example, type of segment, test configuration, test type, types of games, types of events, types of computing device (for example, Xbox v. PC), in combination or the like.

The interface can include a list of search results 508. Each search result can identify additional information associated with the search result. In some embodiments, the system can be configured to provide a popup 510 with additional details associated with a result when an input device selects or hovers over one of the search results. When a search result is selected, the video associated with the result can populate a video player portion 516 of the interface. The video player can include playback controls 512 for viewing the video, such as, for example, play, pause, playback speed, and the like.

The event module 514 can include additional information associated with the gameplay session of the selected search result. For example, as shown in FIG. 5, the event module 350 may include the date, time, type, and description of the event. The user can obtain more details about an event by clicking on the event in the event module.

The event module can include a listing of video segments from the gameplay session. The timeline 372 can allow the user to view the gameplay session at different points in time. Advantageously, when the user clicks on a video segment, the data visualization system may begin to play the recorded video at the starting point of the video segment. At the same time, the data visualization system may also show changes associated with event data from the newly selected video segment. In some embodiments, the user may click on a different video segment from the same gameplay session and the data visualization system can start playing the newly selected video segment. The user may also click on other video segments of the gameplay session.

Example Embodiments of Gameplay Data Analysis

FIGS. 6A and 6B illustrate example embodiments of user interfaces illustrating an analysis of gameplay metrics of aggregated telemetric data. The user interfaces display aggregated telemetry data information associated with a plurality of telemetric events. The data visualization system 146 may display the user interfaces when a user requests additional data metrics regarding telemetric events. Analysis of the gameplay data is further described below with reference to FIGS. 7, 8, and 9.

With reference to FIG. 6A, the user interface 600 provides an example user interface that can provide an output of an analysis of defined gameplay statistics 602 of aggregated telemetric data. The illustrated example provides analysis of a gameplay statistic associated with the final score of Cleveland playing Orlando. The user can select and/or define any gameplay statistics associated with the collected telemetric data. The displayed output for a gameplay statistic can be based on recorded metrics (for example, final score, number of points, number of passes, and the like), derived metrics (for example, average score, average time between scores, median number of points scored, and the like), and/or other types of metrics that are associated with the gameplay sessions.

In the illustrated embodiment, the user can select one or more gameplay statistics 602 using one or more user inputs, such as drop down boxes or text entry boxes. An output representing one or more data sets and/or derived game metrics 604 can be generated (for example, average, max value, min value, standard deviation, and the like). The user may customize how to display the output within the user interface.

The user interface 600 can generate a visual representation 606 of the data metrics. One or more of the generated datasets 608 can be displayed. In some embodiments, the user can provide target ranges, as illustrated by the shaded portion 610. The data visualization system 146 can display game metrics in a variety of formats such as, for example, graphs (for example pie charts, heat maps, tables, line graphs), tables, word descriptions, and so on.

With reference to FIG. 6B, the user interface 600 provides another example an output of an analysis of gameplay metrics 602 of aggregated telemetric data. In this example, derived data metrics 604 are being displayed that are associated with plays in a game. The user can select any game metric associated with the collected telemetric data. In the illustrated embodiment, the data is displayed on a timeline 612 at defined time intervals. The data analysis provides aggregated data points associated with each interval. For example, the data for each dataset 608 can be aggregated over a week. The aggregated data can then be parsed and divided into subsets of data representing each day of the week and displayed on a timeline.

The data analysis system 144 can analyze data of any defined time period (for example, minutes, hours, days, weeks, and the like) and/or any defined segment (for example, per play, per quarter, per game level, and the like). The data analysis system can provide for the analysis of any number of data sets. In the illustrated example, eleven data sets are being provided for comparison. The user may customize which metrics, the type of analysis, and how the results are displayed within the user interface. The user can select to display the game metrics over any defined time period. For example, the user could display data before and after a game application patch in order to visualize how the game metrics have changed based on the patch.

FIG. 7 provides additional detail associated with analysis of aggregated telemetric by the data analysis system 144. The data analysis system 144 can be configured to create gameplay statistics 702 associated with gameplay events recorded during gameplay sessions. The generation of a gameplay statistic 702 is described with further reference to FIG. 8.

Figure 8:
FIG. 8 illustrates an embodiment of generating a gameplay statistic.

With additional reference to FIG. 8, an example embodiment of generating a gameplay statistic 702 is illustrated. The gameplay statistic 702 can be based on one or more gameplay events that trigger within the game application. A gameplay event or a grouping of gameplay events can be associated with a specific a gameplay event filter 704. The gameplay event filter 704 can be used to identify the target data set associated with a gameplay event or data sets associated with a grouping of gameplay events, for example, a shot made in a basketball game, an attack executed, speaking with an in-game character, or any other event. The gameplay event filters 704 include one or more target parameters 706 associated with the gameplay events. The target parameters 706 can include additional information associated with the gameplay event. For example, in a basketball game, the target parameters may include the point value associated with a basket (for example, one point, two points, or three points), the distance from the basket where the shot was taken, or another parameter value associated with the event. The gameplay statistic can return the output based on the identified target parameter. In some embodiments, if no target parameter is identified, the data analysis can return a count for each time the event occurred.

In the illustrated example, the gameplay statistic 702 being defined is "Score," which name can be defined by the user. A gameplay event(s) 704 is identified using the specific gameplay event identifier used within the game application. The gameplay event identifier is used by the data analysis system 144 to access the dataset associated with the gameplay event. In this embodiment, the "SHOT_MADE" gameplay event is associated with a shot being made within a basketball game. The column 716 identifies all the events that triggered during the defined segment A target parameter 706 is identified using the specific target parameter identifier used within the game application. The target parameter is used by the data analysis system 144 to access the parameter within the data set. In this embodiment, the "VALU" target parameter indicates the point value associated with basket.

With reference now to FIG. 7, the data analysis process is further described. The interface can provide for the selection of one of the defined gameplay statistics 702 and the type of analysis 710 to perform on the selected gameplay statistic. The type of analysis can also be referred to as a derived gameplay metric 710. The derived game metrics may include various calculations, such as, for example, average, maximum value, minimum value, sum, count, standard deviation, and the like. The gameplay segment 712 identifies the type of gameplay segment used for calculating the derived gameplay metric 710. A segment filter 714 can filter the segments to a subset of the total data set of segments. For example, the filter may be used to identify only segments where a first team (for example, Cleveland) played a second team (for example, Orlando). A color identifier 716 can identify an output color associated with the data set.

Columns 718, 720 and 722 provide an illustrative example of processing data associated with a gameplay statistic 702. In the illustrated example, the gameplay statistic 702 is "Score" and the segment is a game, which has beginning and end points illustrated by the arrows. The event column 718 identifies each event that occurred within the segment. The identified events correspond to the gameplay event identifier 704 of the gameplay statistic 702. The value column 720 identifies the value associated with each event. The identified value corresponds to the value associated with the target parameter 706 of the gameplay statistic 702. The value will depend on the target parameter and the gameplay event. In some embodiments, the output may not be a numeric output The average column 722 calculates a value for the segment based on identified metric 710. Each identified segment can have a corresponding calculated metric value. In some instances, segments, where none of the identified events occur, are removed from the calculation. An overall value 724 may be computed for all segments.

Figure 9:
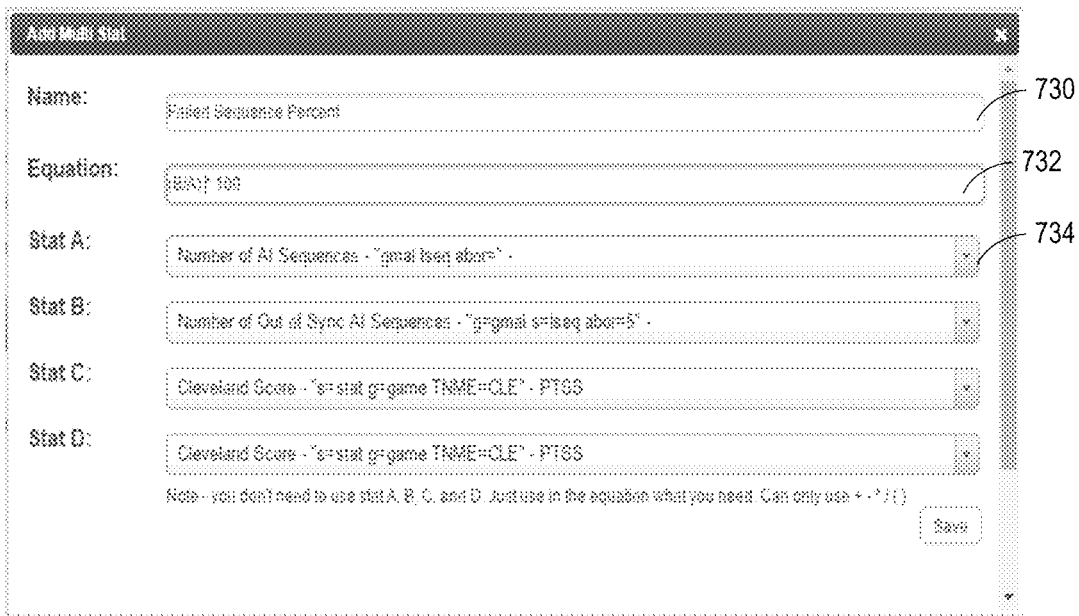
FIG. 9 illustrates an embodiment of performing calculations using the aggregated data from gameplay events.

FIG. 9 illustrates an example embodiment of performing calculations using the aggregated data from gameplay events. The MPS 730 can be used perform post-collection calculations on the event data using a defined equation 732. The defined equation 732 can be used to calculate an output. The formula can use mathematical operators and one or more gameplay event variables 734. The gameplay event variables 734 can be gameplay statistics (such as, gameplay statistics 702) or gameplay events (such as, gameplay events 704), derived gameplay metrics, and/or other types of numerical variables that can be used in the equation 732. The equation can be calculated and output in the same manner as other gameplay statistics are calculated. The equation can include more or less than the number of variables in the illustrated example.

Example Process of Capturing Telemetry Data and Video Data

Figure 10:
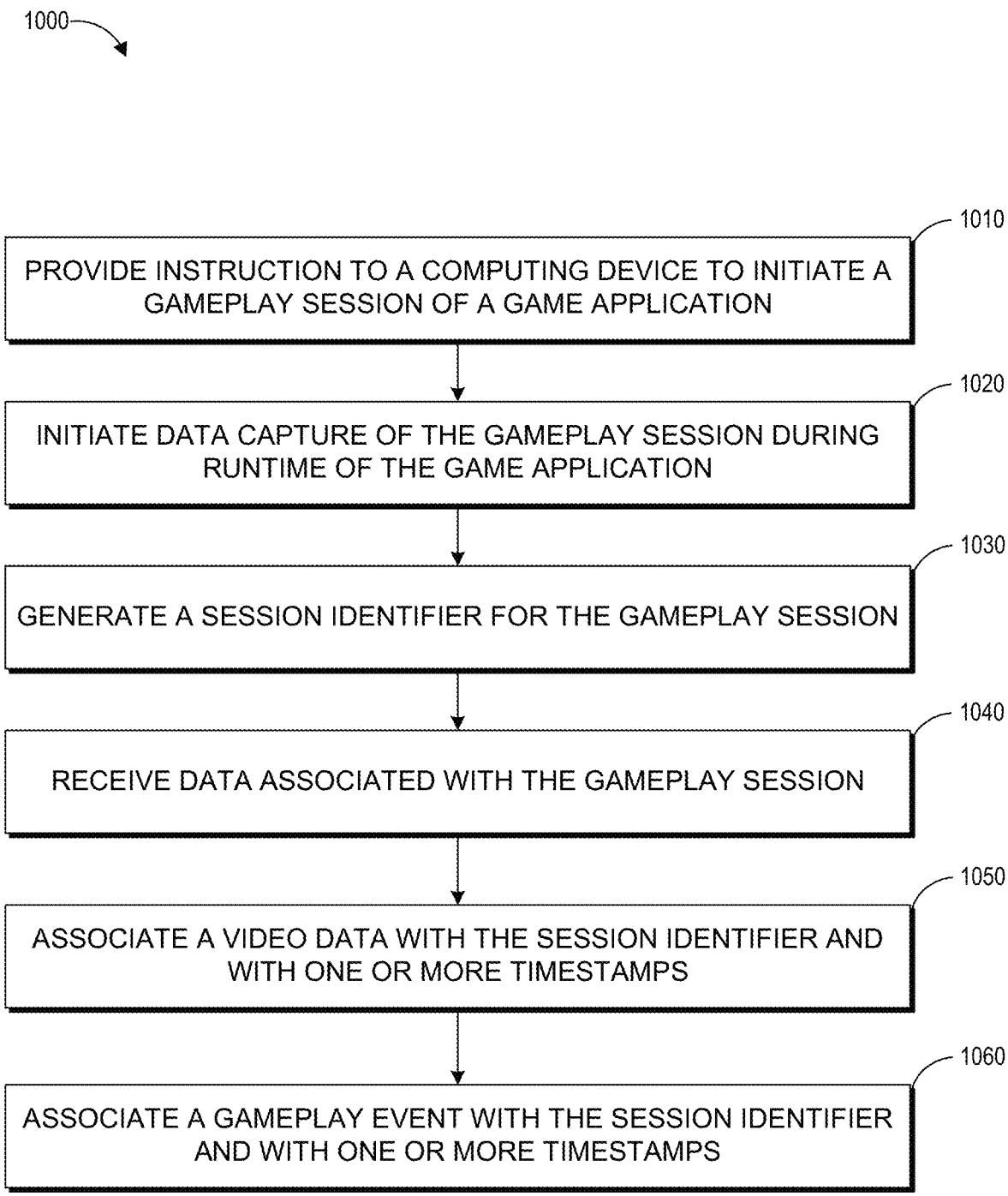
FIG. 10 illustrates a flowchart of an embodiment of associating telemetry data with video data.

FIG. 10 illustrates an embodiment of a flowchart for a method of associating telemetry data with video data. The process 1000 can be implemented by any system that can decode and stream content within a game environment during runtime of a game application. For example, the process 1000, in whole or in part, can be implemented by a game application 104, a gameplay acquisition system 130, a user computing system 103, a player computing system 102, an interactive computing system 120, or other application module. Although any number of systems, in whole or in part, can implement the process 700, to simplify discussion, the process 1000 will be described with respect to the interactive computing system 120 and particular systems of the gameplay acquisition system 130.

In process 1000, at block 1010 the gameplay acquisition system 130 can communicate with the player computing system 102 in order to initiate a gameplay session of the game application 104. During automated testing the game automation system 142 can communicate with the player computing system 102. The game automation system 142 can initiate the gameplay session in accordance with a defined automation schedule, which can control the parameters used for the automated gameplay session, such as, for example, the type of agent, the duration of the gameplay session, the level within the game application, the number of virtual agents within the game, and any other characteristics associated with an automated gameplay session. During manual testing, the coordination server 132 can provide an indication to a user of the player computing system 102 to initiate a gameplay session. The indication may also include indications of the parameters used for the gameplay session.

At block 1020, the gameplay acquisition system 130 can initiate data capture of the gameplay session during runtime of the game application on the player computing system 102. In some embodiments, the coordination system 132 can provide instructions to the video acquisition system to initiate capture of the video stream, and provide instructions to the telemetry data acquisition system 134 to initiated capture of the telemetry data stream. In some embodiments, the video acquisition system and the telemetry data acquisition system are the same system. In some embodiments, the coordination server can associate and/or instantiate one or more a virtual machine in order to capture the data from the gameplay session. For example, a virtual machine may be associated with the video acquisition system 138 and a virtual machine may be associated with the telemetry data acquisition system 134.

At block 1030, a session ID is generated for the gameplay session. The session ID may be generated by the interactive computing system 120, the coordination system 132, or the player computing system 102. In certain embodiments, the session ID may include information unique to the player computing system 102, such as the IP address associated with the player computing system 102.

At block 1040, the gameplay acquisition system 130 can receive data associated with the gameplay session. The data associated with the gameplay session may include video data, telemetry data, system data, and/or other data associated with the execution of the game application during the gameplay session. In some embodiments, separate systems can individually communicate with the game application and acquire specific data associated with the gameplay session. For example, the video acquisition system 138 can acquire video data, the telemetry data acquisition system 134 can acquire telemetry data, and/or other systems can be responsible for acquiring different types of data. Each system can store their respective data in data stores associated with the respective system. In some embodiments, the telemetry data acquisition system can record a defined event that is triggered occur when defined criteria have been satisfied. For example, an event may be scripted to trigger only after the movement speed of a character within the game increases above a threshold.

At block 1050, the interactive computing system 120 can associate the session ID with the video data of the gameplay session. For example, the video acquisition system 144 can associate the session ID with the video data received from the gameplay session. The video data can include with timestamps for the gameplay session. For example, the video data may generate timestamps associated with each frame of video data received during the gameplay session. The gameplay acquisition system 130 can associate the video data with the session ID. The gameplay acquisition system 130 may store the recorded video in a data store, such as data store 124.

At block 1060, the interactive computing system 120 can associate an event in the gameplay session with the session ID of the gameplay session and one or more timestamps. The telemetry data acquisition system 134 can associate the session ID with the telemetry data received from the gameplay session. An event may be associated with one or more timestamps. The session ID and timestamp information associated with an event can be used to retrieve video data associated with the gameplay event. The gameplay acquisition system 130 can associate the received telemetry data with the session ID.

Example Process of Gameplay Data Analysis

Figure 11:
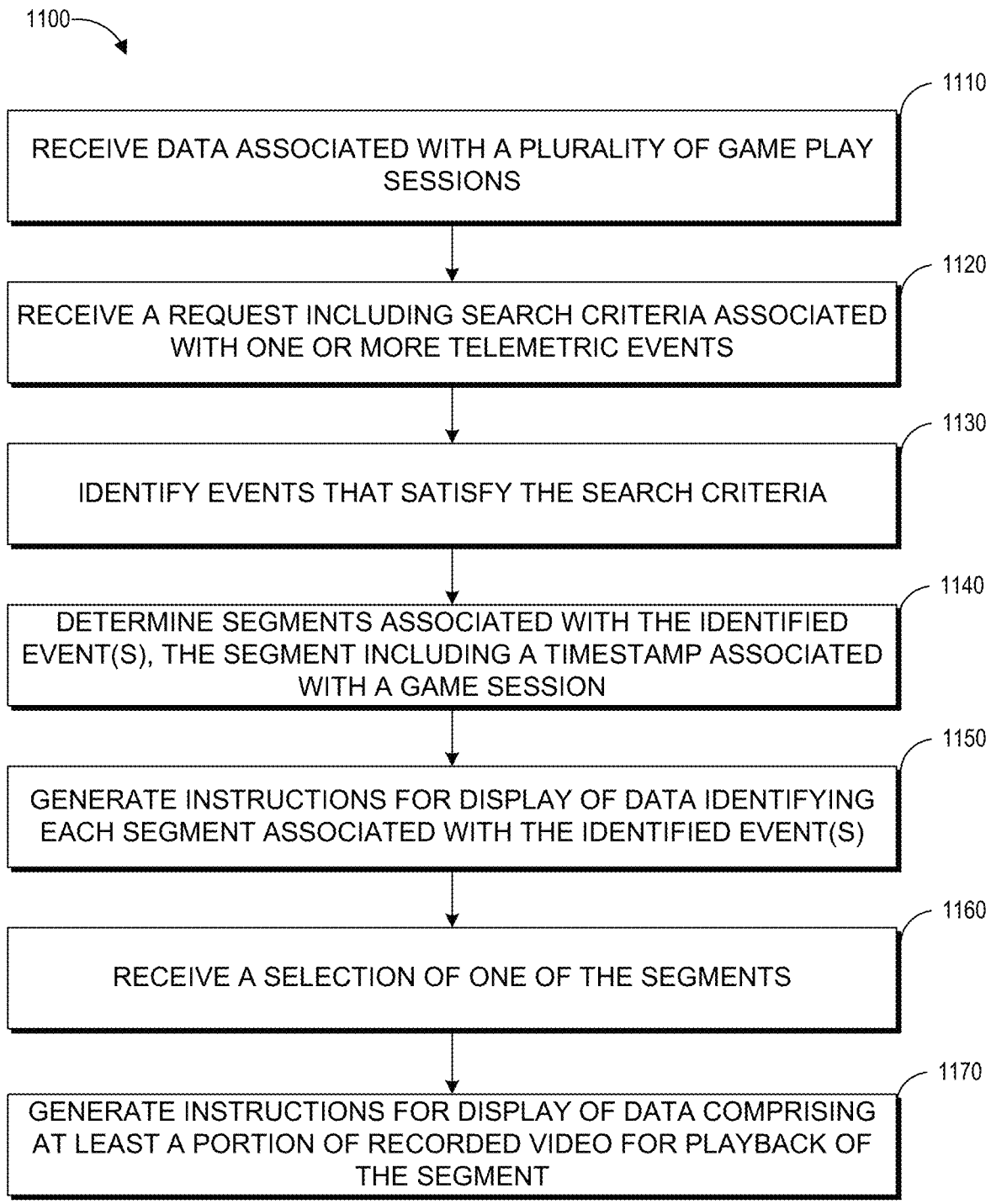
FIG. 11 illustrates a flowchart of an embodiment of a gameplay acquisition system 130 process.

FIG. 11 illustrates a flowchart of an embodiment for a gameplay acquisition system 130 process. The process 1100 can be implemented by any system that can decode and stream content within a game environment during runtime of a game application. For example, the process 1100, in whole or in part, can be implemented by a game application 104, a gameplay acquisition system 130, a user computing system 103, a player computing system 102, an interactive computing system 120, or other application module. Although any number of systems, in whole or in part, can implement the process 1100, to simplify discussion, the process 1100 will be described with respect to the interactive computing system 120 and particular systems of the gameplay acquisition system 130.

At block 1110 of process 1100, the interactive computing system 120 can receive data associated with a plurality of gameplay sessions of a game application. Each gameplay session can include a session ID. The data associated with each session ID can include video data, telemetry data, system data, and/or other data associated with the gameplay session.

At block 1120, the interactive computing system 120 can receive a request including a search criteria associated with one or more telemetric events. The request may come from the user computing system 103 (shown in FIG. 1). The search criteria can specify complex searches in order to identify occurrences of events, characteristics associated with the events, and other event data associated with gameplay sessions. For example, a search query may request all missed 3 point shots that occurred in the last 3 seconds of a game. The search queries may identify events by one or more event identifiers described herein.

At block 1130, the interactive computing system 120 can identify each event that satisfies the search criteria. At block 1140, the interactive computing system 120 can determine a segment associated with each of the identified events. The segment associated with an event can be based on a user selection. A game application can include different types of segments. For example, in a football game, defined segments may include events, plays, and quarters. A segment can define a start time. A segment start timestamp can be used to identify start time for replay of the video file. The telemetry data acquisition system and/or the search system can identify the closest segment that occurs prior to the triggering of an identified event.

At block 1150, the interactive computing system 120 can generate instructions for display of data identifying each segment associated with the identified events(s). The interactive computing system 120 can provide each identified segment within a user interface. Each identified segment can include additional information associated with the segment, such as for example, a session ID, a segment ID, an event ID, duration of the segment, and other information associated with the segment. The instructions may be transmitted to the data visualization system 146 of the user computing system 103. The data may include telemetry data associated with the event, event description, one or more search criteria, or the like.

At block 1160, the interactive computing system 120 can receive a selection of one of the identified segments. At block 1170, responsive to the selection of the segment, the interactive computing system 120 can locate video data associated with the gameplay session using the session ID. The interactive computing system 120 can generate instructions to display video data associated with the event. The instructions may be transmitted to the data visualization system 146 of the user computing system 103. The video data may include a complete video that includes what was previously recorded and stored by the video acquisition system. The data may include telemetry data associated with the event, event description, one or more search criteria, or the like. The instructions may instruct the data visualization system 146 to play the recorded video from a timestamp where the event begins.

Overview of Computing Device

Figure 12:
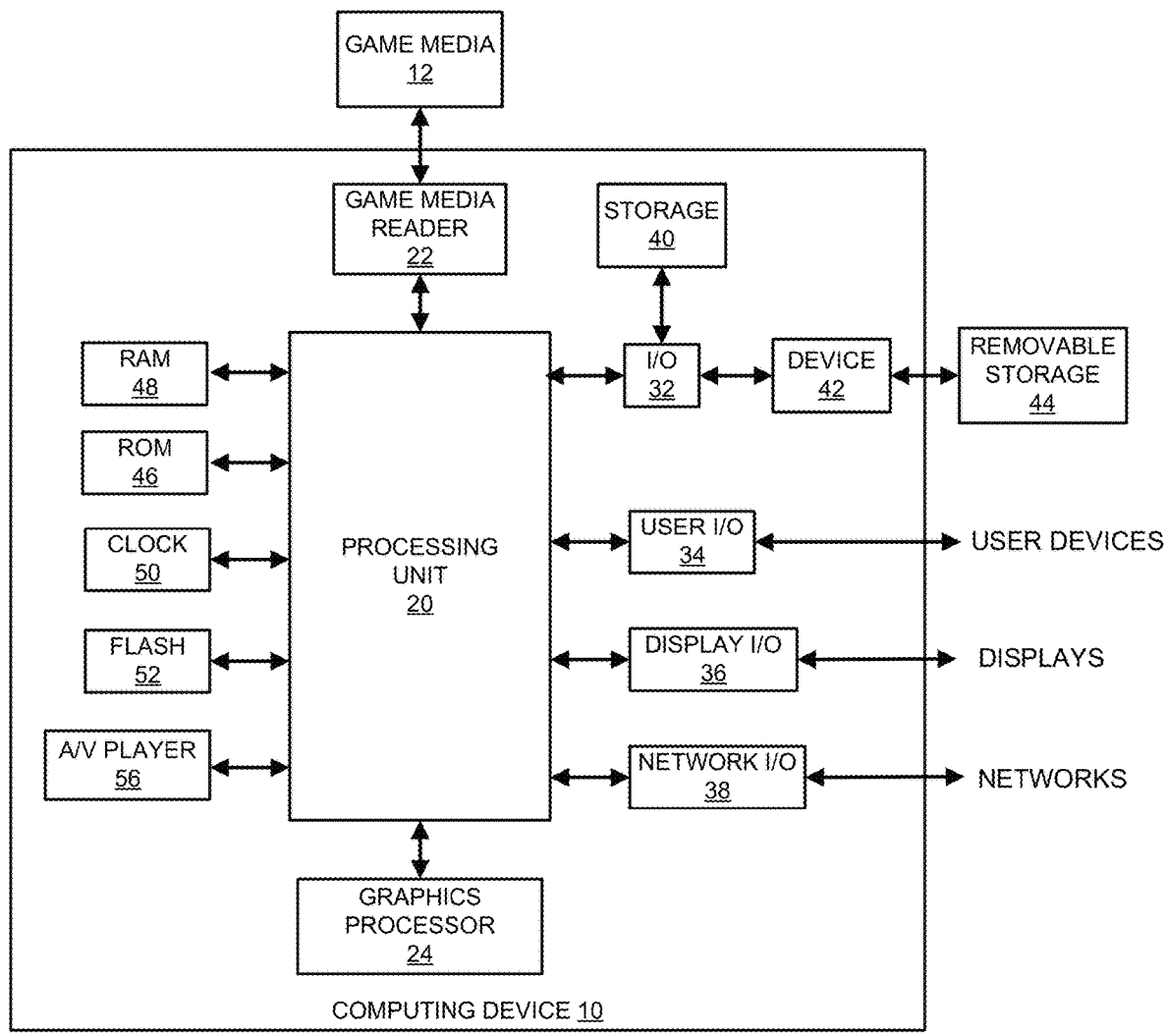
FIG. 12 illustrates an embodiment of a computing device.

FIG. 12 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. The computing device 10 may also be distributed across multiple geographical locations. For example, the computing device 10 may be a cluster of cloud-based servers.

As shown, the computing device 10 includes a processing unit 20 that interacts with other components of the computing device 10 and also external components to computing device 10. A game media reader 22 is included that communicates with game media 12. The game media reader 22 may be an optical disc reader capable of reading optical discs, such as CD-ROMs or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld game application device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O 34 can include a touchscreen input. The touchscreen can be capacitive touchscreen, a resistive touchscreen, or other type of touchscreen technology that is configured to receive user input through tactile inputs from the player. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprise signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise a hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM 48 is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads game media 12 and provides an application, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
  at least one data store comprising gameplay data associated with a game application; and
  a server computing system in electronic communication with the at least one data store and configured to execute computer-readable instructions that configure the server computing system to:

provide instructions to a first computing system to configure an automated gameplay session of the game application in accordance with automated testing parameters, wherein the automated gameplay session is configured to use at least one artificial intelligence (AI) controlled agent, wherein the at least one AI controlled agent is configured to control execution of the game application on the first computing system during the automated gameplay session;

initiate the automated gameplay session of the game application on the first computing system;

initiate data acquisition of the gameplay session of the game application executing on the first computing system;

generate a session identifier for the gameplay session;

receive video data associated with the gameplay session;

associate the video data with the session identifier of the gameplay session;

receive telemetric events triggered during the gameplay session, the telemetric events comprising non-scripted telemetric events and scripted telemetric events, the scripted telemetric events triggered during the gameplay session based at least in part on a scripted event trigger, the scripted event trigger configured to trigger when characteristics of a virtual entity satisfy a defined threshold during the gameplay session, wherein each telemetric event is associated with an event timestamp based on when the telemetric event triggered during the gameplay session, wherein each telemetric event is associated with and occurs within at least a first gameplay segment type and a second gameplay segment type, each of the first gameplay segment type and the second gameplay segment type has a different gameplay segment length during the gameplay session, wherein the second gameplay segment type is nested within the first gameplay segment type such that a plurality of gameplay segments of the second gameplay segment type occur sequentially within the segment length of the first gameplay segment type, wherein a plurality of gameplay segments of the first gameplay segment type occur during the gameplay session, each gameplay segment having a segment start timestamp and a segment end timestamp distinct from the event timestamp, wherein the segment start timestamp is used as a start time for viewing video data associated with an event occurring within the gameplay segment;

associate the telemetric events with the session identifier of the gameplay session; and output the video data and telemetric events for storage within the at least one data store.

2. The system of claim 1, wherein the computer-readable instructions further configure the server computing system to initiate execution of the automated gameplay session of the game application on the first computing system based on a defined automation schedule, wherein the defined automation schedule defines the automated testing parameters used for configuring the automated gameplay session, wherein the automated testing parameters include at least one of a number and type of AI controlled agents controlling execution of the game application, a duration of the automated gameplay session, or a game level within the game application.

3. The system of claim 1, wherein the computer-readable instructions further configure the one or more AI controlled agents to control operation of the game application during the automated gameplay session by at least one of interfacing with an application programming interface (API) of the game application or simulating input actions on a peripheral input device of the first computing system.

4. The system of claim 1, wherein the at least one data store comprises a first data store and a second data store, wherein the video data is stored in the first data store and the telemetric events are stored in the second data store.

5. The system of claim 4, wherein the video data associated with the gameplay session is independent of the telemetric events associated with the gameplay session.

6. The system of claim 1, wherein the video data further comprises audio data associated with the gameplay session.

7. The system of claim 1, wherein the event timestamp is independent of a start time of the gameplay session.

8. The system of claim 1, wherein the server computing system is further configured to encode the video data into a standard file format when outputting the video data.

9. The system of claim 1, wherein the computer-readable instructions further configure the server computing system to provide instructions to one or more virtual machines to communicate with the first computing system in order to acquire data during the gameplay session.

10. The system of claim 1, wherein the computer-readable instructions further configure the server computing system to aggregate the telemetric events associated with the gameplay session with telemetric events associated with other gameplay sessions, and provide at least a portion of the telemetric events to a second computing system in response to a search query associated with the game application.

11. A computer-implemented method comprising:
under control of a computer system comprising computer hardware, the computer system configured with computer executable instructions:

providing instructions to a first computing system to configure an automated gameplay session of the game application in accordance with automated testing parameters, wherein the automated gameplay session is configured to use at least one artificial intelligence (AI) controlled agent, wherein the at least one AI controlled agent is configured to control execution of the game application on the first computing system during the automated gameplay session;

initiate the automated gameplay session of the game application on the first computing system;

initiating data acquisition of the gameplay session of the game application executing on the first computing system;

generating a session identifier for the gameplay session;

receiving video data associated with the gameplay session;

associating the video data with the session identifier of the gameplay session;

receiving telemetric events triggered during the gameplay session, the telemetric events comprising non-scripted telemetric events and scripted telemetric events, the scripted telemetric events triggered during the gameplay session based at least in part on a scripted event trigger, the scripted event trigger configured to trigger when characteristics of a virtual entity satisfy a defined threshold during the gameplay session, wherein each telemetric event is associated with an event timestamp based on when the telemetric event triggered during the gameplay session, wherein each telemetric event is associated with and occurs within at least a first gameplay segment type and a second gameplay segment type, each of the first gameplay segment type and the second gameplay segment type has a different gameplay segment length during the gameplay session, wherein the second gameplay segment type is nested within the first gameplay segment type such that a plurality of gameplay segments of the second gameplay segment type occur sequentially within the segment length of the first gameplay segment type, wherein a plurality of the first type of gameplay segments occur during the gameplay session, each gameplay segment having a segment start timestamp and a segment end timestamp distinct from the event timestamp, wherein the segment start timestamp is used as a start time for viewing video data associated with an event occurring within the gameplay segment;

associating the telemetric events with the session identifier of the gameplay session; and outputting the video data and telemetric events for storage within at least one data store.

12. The method of claim 11 further comprising initiating execution of the automated gameplay session of the game application on the first computing system based on a defined automation schedule, wherein the defined automation schedule defines the automated testing parameters used for configuring the automated gameplay session.

13. The method of claim 11 further comprising providing instructions to one or more virtual machines to communicate with the first computing system in order to acquire data during the gameplay session.

14. The method of claim 11, wherein each telemetric event is triggered based, at least in part, on a defined triggering criteria.

15. The method of claim 11, wherein outputting the video data further comprises encoding the video data into a standard file format.

16. The method of claim 11 further comprising aggregating the telemetric events associated with the gameplay session with telemetric events associated with other gameplay sessions, and providing at least a portion of the telemetric events to a second computing system in response to a search query associated with the game application.

17. A non-transitory computer-readable storage medium having stored thereon computer-readable instructions that, when executed, configure a computing system to:

provide instructions to a first computing system to configure an automated gameplay session of the game application in accordance with automated testing parameters, wherein the automated gameplay session is configured to use at least one artificial intelligence (AI) controlled agent, wherein the at least one AI controlled agent is configured to control execution of the game application on the first computing system during the automated gameplay session;

initiate the automated gameplay session of the game application on the first computing system;

initiate data acquisition of the gameplay session of the game application executing on the first computing system;

generate a session identifier for the gameplay session;

receive video data associated with the gameplay session;

associate the video data with the session identifier of the gameplay session;

receive telemetric events triggered during the gameplay session, the telemetric events comprising non-scripted telemetric events and scripted telemetric events, the scripted telemetric events triggered during the gameplay session based at least in part on a scripted event trigger, the scripted event trigger configured to trigger when characteristics of a virtual entity satisfy a defined threshold during the gameplay session, wherein each telemetric event is associated with an event timestamp based on when the telemetric event triggered during the gameplay session, wherein each telemetric event is associated with and occurs within at least a first gameplay segment type and a second gameplay segment type, each of the first gameplay segment type and the second gameplay segment type has a different gameplay segment length during the gameplay session, wherein the second gameplay segment type is nested within the first gameplay segment type such that a plurality of gameplay segments of the second gameplay segment type occur sequentially within the segment length of the first gameplay segment type, wherein a plurality of the first type of gameplay segments occur during the gameplay session, each gameplay segment having a segment start timestamp and a segment end timestamp distinct from the event timestamp, wherein the segment start timestamp is used as a start time for viewing video data associated with an event occurring within the gameplay segment;

associate the telemetric events with the session identifier of the gameplay session; and output the video data and telemetric events for storage within at least one data store.

18. The non-transitory computer-readable storage medium of claim 17, wherein the computer-readable instructions further configure the computing system to aggregate the telemetric events associated with the gameplay session with telemetric events associated with other gameplay sessions, and provide at least a portion of the telemetric events to a second computing system in response to a search query associated with the game application.

19. The non-transitory computer-readable storage medium of claim 17, wherein the automated testing parameters include a number and type of AI controlled agents controlling execution of the game application.

20. The non-transitory computer-readable storage medium of claim 17, wherein the session identifier is automatically generated for a gameplay session.

* * * * *